(12) United States Patent
Thomas

(10) Patent No.: US 7,111,871 B2
(45) Date of Patent: Sep. 26, 2006

(54) AUTOMOTIVE VEHICLE AIR BAG SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 361 days.

(21) Appl. No.: 10/634,021

(22) Filed: Aug. 2, 2003

(65) Prior Publication Data

US 2005/0023811 A1    Feb. 3, 2005

(51) Int. Cl.
B60R 21/16    (2006.01)
(52) U.S. Cl. .................................. 280/743.2
(58) Field of Classification Search ............ 280/742.3, 280/741, 742, 731, 730.2
See application file for complete search history.

(56) References Cited

U.S. PATENT DOCUMENTS

| | | | |
|---|---|---|---|
| 5,887,894 A | 3/1999 | Castagner et al. | 280/743.2 |
| 5,951,043 A | 9/1999 | Mooney et al. | 280/741 |
| 6,334,627 B1 * | 1/2002 | Heym et al. | 280/743.2 |
| 6,390,501 B1 | 5/2002 | Greib et al. | 280/743.2 |
| 6,422,597 B1 | 7/2002 | Pinsenschaum et al. | 280/735 |
| 6,454,300 B1 | 9/2002 | Dunkle et al. | 280/742 |
| 6,511,094 B1 | 1/2003 | Thomas et al. | 280/743.2 |
| 6,513,835 B1 | 2/2003 | Thomas | 280/743.2 |
| 6,561,545 B1 | 5/2003 | Greib et al. | 280/743.2 |
| 6,592,146 B1 * | 7/2003 | Pinsenschaum et al. | 280/743.2 |
| 6,918,614 B1 * | 7/2005 | Ryan | 280/743.2 |
| 6,932,384 B1 * | 8/2005 | Waid et al. | 280/739 |
| 2002/0036400 A1 | 3/2002 | Winters et al. | |
| 2002/0096871 A1 | 7/2002 | Pinsenschaum et al. | |
| 2002/0135164 A1 | 9/2002 | Thomas | |

FOREIGN PATENT DOCUMENTS

WO    WO 0134436    5/2001

* cited by examiner

Primary Examiner—Faye M. Fleming
(74) Attorney, Agent, or Firm—Laura C. Hargitt

(57) ABSTRACT

The present invention is for a vehicle having an air bag system for impact restraint. The air bag system includes a gas emitting inflator for emitting inflation gas upon receiving a signal of an impact, a fill tube having a fill end in fluid communication with the inflator to port the inflation gas from the inflator, and an air bag cushion in fluid communication with the fill tube to receive the inflation gas from the fill tube and deployable in an interior space adjacent to a seat upon the impact. The air bag system also includes a tether operable to both a restricted and unrestricted length in conjunction with a dual depth mechanism. The air bag system may further include a vent operable to both an open and a closed state in conjunction with the dual depth mechanism.

39 Claims, 20 Drawing Sheets

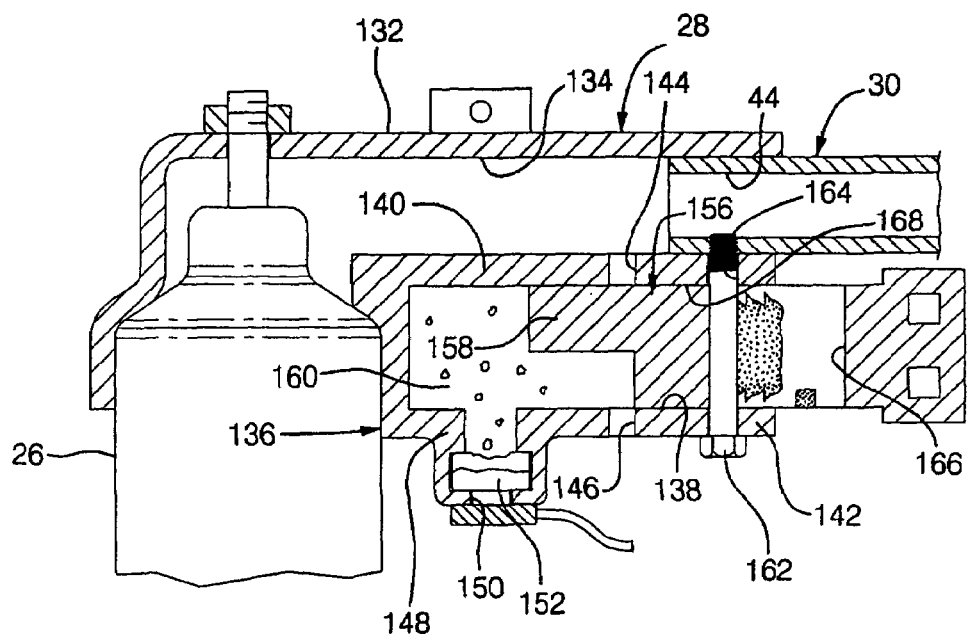
FIG. 10
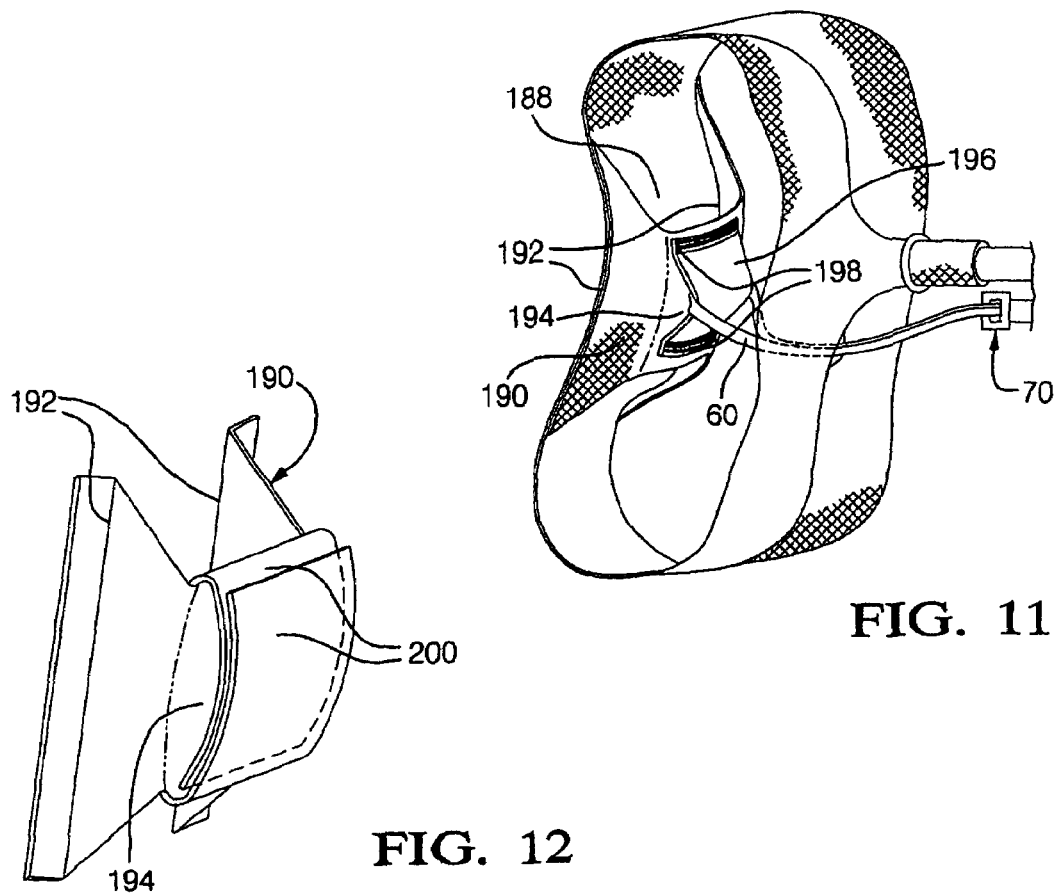
FIG. 11
FIG. 12

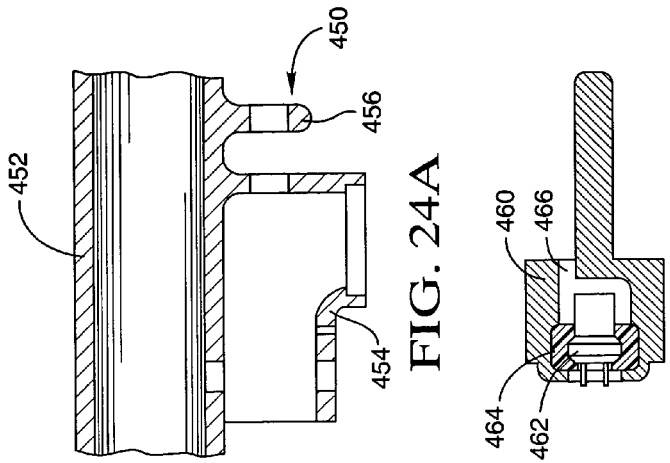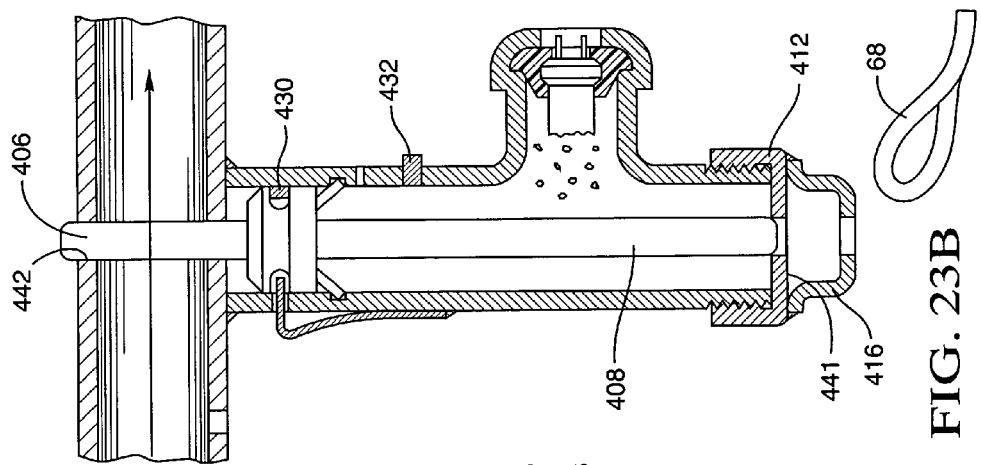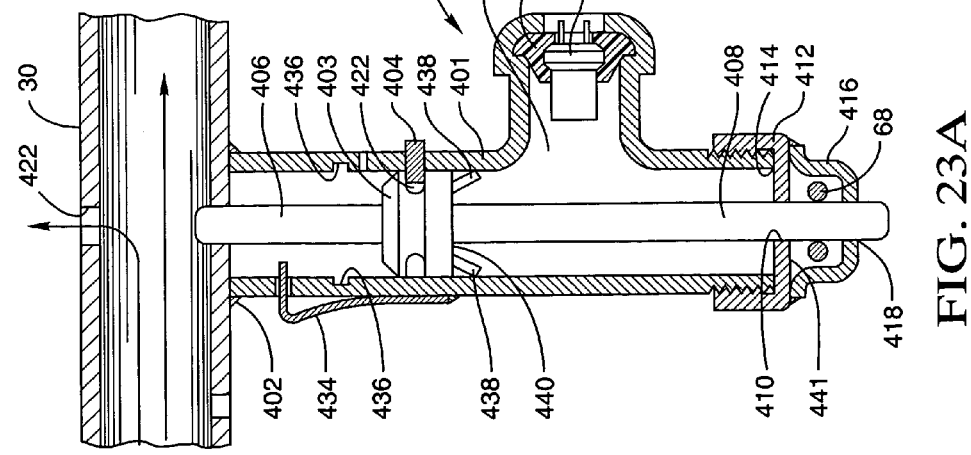

AUTOMOTIVE VEHICLE AIR BAG SYSTEM

TECHNICAL FIELD

The present invention is for an air bag system installed in an automotive vehicle.

BACKGROUND OF THE INVENTION

Air bags are a known safety device installed in vehicles today. For supplemental occupant protection during a collision, air bags may be used. Air bag packaging is a continuing challenge. The need to position the air bag such that it will be deployable in the desired space must be reconciled with spatial constraints imposed by other vehicle componentry. For instance, frontal air bags are traditionally installed in the hub of the steering wheel for the driver and in a recess of the instrument panel for the front seat passenger. This allows the air bags to fill the space between the passenger and the front interior of the vehicle upon deployment in a frontal collision.

Frontal passenger air bag modules are relatively large and may drive larger than desired instrument panels from an interior volume stand point. Vehicle designers are exploring ways to provide more interior space for the passengers. One means is to design an "open cockpit", which could benefit from packaging the frontal air bag in a non-traditional location that is not within the instrument panel.

In addition, the art continues to investigate alternative ways to deploy air bags.

SUMMARY OF THE INVENTION

The present invention is for a vehicle having an air bag system for impact restraint. The air bag system provides protection to an occupant in the event of a collision by deploying an air bag in the space between the occupant seat and the vehicle interior components adjacent to the occupant.

The air bag system includes a gas emitting inflator for emitting inflation gas upon receiving a signal of an impact, a fill tube having a first, fill end in fluid communication with the inflator to port the inflation gas from the inflator, and an air bag module in fluid communication with the fill tube and having an air bag cushion packed therein to receive the inflation gas from the fill tube. The air bag cushion is deployable in the interior space adjacent to the occupant seat upon the impact.

The air bag system also includes a tether operable to both a restricted and unrestricted length in conjunction with a dual depth mechanism, such that the cushion may be deployed to either a shallow depth bag or a deep depth bag. Several dual depth mechanisms may be employed. Several tether configurations may be used for routing the tether through the cushion and dual depth mechanism.

BRIEF DESCRIPTION OF THE DRAWINGS

FIG. 10 illustrates the dual depth mechanism of FIG. 8 in its actuated position;

FIG. 11 illustrates a tether routing scheme with part of the cushion cut away;

FIG. 12 illustrates construction of a tubular slot;

FIG. 23A illustrates a fifth dual depth mechanism in its non-actuated position;

FIG. 23B is an illustration of the dual depth mechanism of FIG. 233A in its actuated position;

DESCRIPTION OF THE PREFERRED EMBODIMENTS

The present invention relates to an air bag system, wherein the air bag system includes a remotely located inflator and a fill tube to deliver inflation gas to an air bag cushion. The cushion may deploy in front of the occupant for restraint during an impact. One such frontal passenger air bag system was described in copending U.S. application Ser. No. 10/176,540 entitled "Automotive Vehicle Air Bag System", which is expressly incorporated by reference. The present invention is at least partially based upon advances over this application by providing a cushion deployable to either a shallow depth or a deep depth.

Figure 1A:
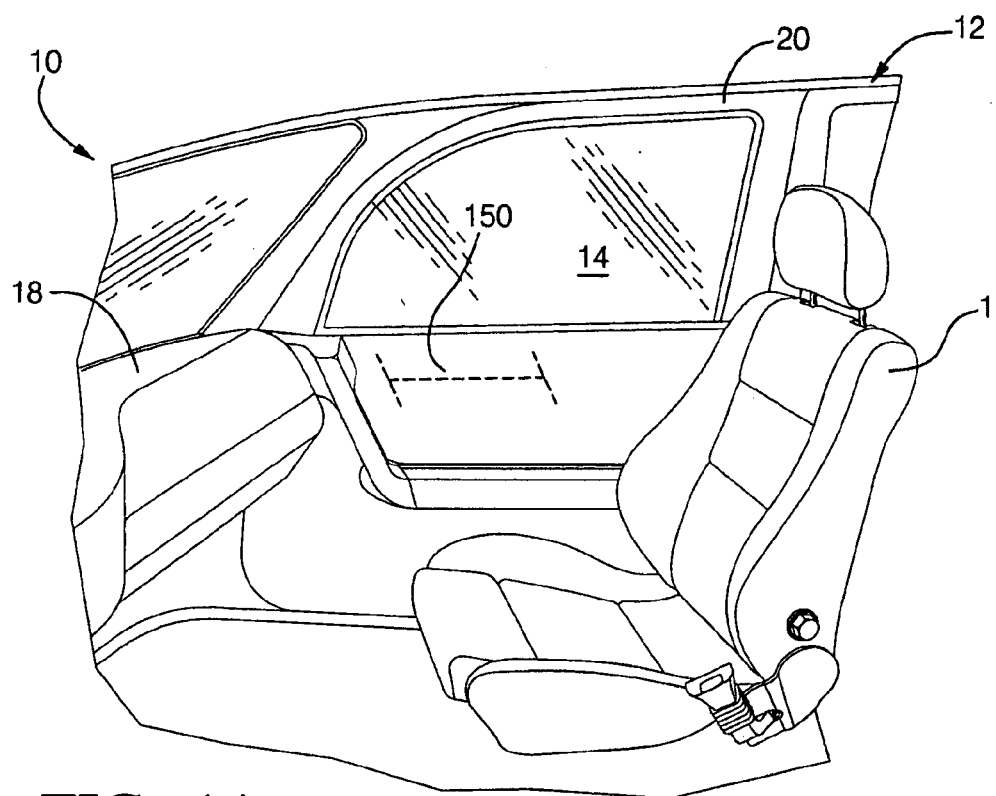
FIG. 1A is a schematic view of the interior of a vehicle.

FIG. 1A illustrates a vehicle 10 having a vehicle body 12 defining a vehicle interior space 14. Located within the interior space 14 are occupant seats including a driver seat, not shown, and a passenger seat 16, and an instrument panel 18 forward of the seats. A steering wheel (not shown) is forward of the driver seat in the instrument panel. Side openings in the vehicle body are closed by a driver side vehicle door (not shown) and a passenger side vehicle door 20.

The present invention air bag system 22 operates to deploy during an impact. Due to the distribution of components (i.e., the use of a fill tube, allowing for a remote inflator), the air bag system 22 may be packaged in a variety of locations. For the present description, the air bag system 22 will be described as being packaged within the passenger side vehicle door 20.

During a collision of sufficient severity to warrant air bag deployment, a remotely located sensing system, not shown, sends a signal to the air bag system to deploy the cushion. During deployment, schematically illustrated in FIG. 1B, an air bag cushion 24, also referred to as an air bag, deploys out of the passenger side vehicle door 20, into the interior volume 14 rearward of the instrument panel 18 and forward of the passenger, thus providing an inflated cushion 24 to restrain the passenger in a frontal impact. The present invention provides a cushion which is capable of inflating to at least two depths—a shallow depth shown in phantom and a deep depth. The air bag system will now be described in greater detail.

Figure 2:
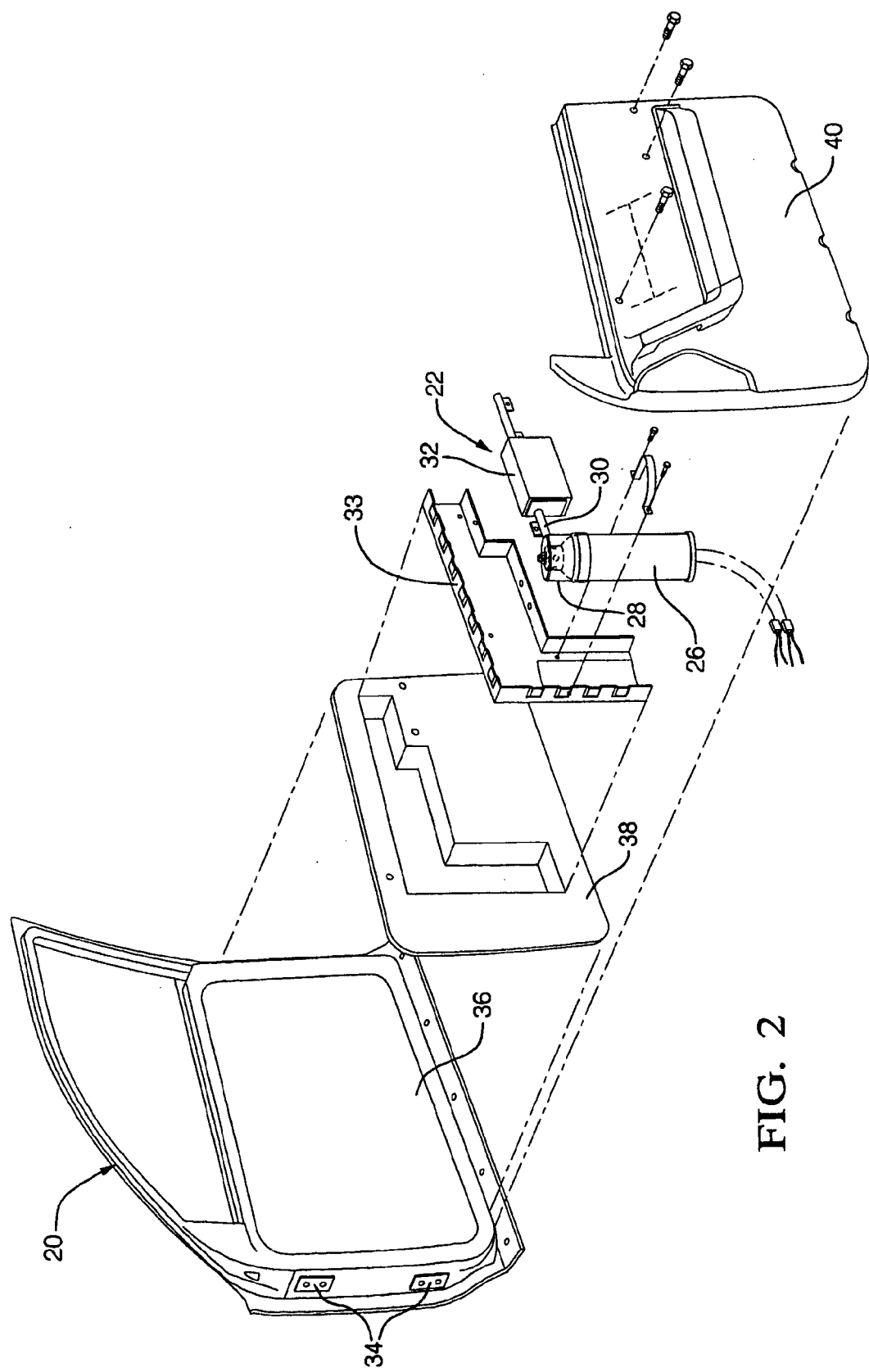
FIG. 2 is an expanded view of the passenger side vehicle door with the air bag system of the present invention.
Figure 3:
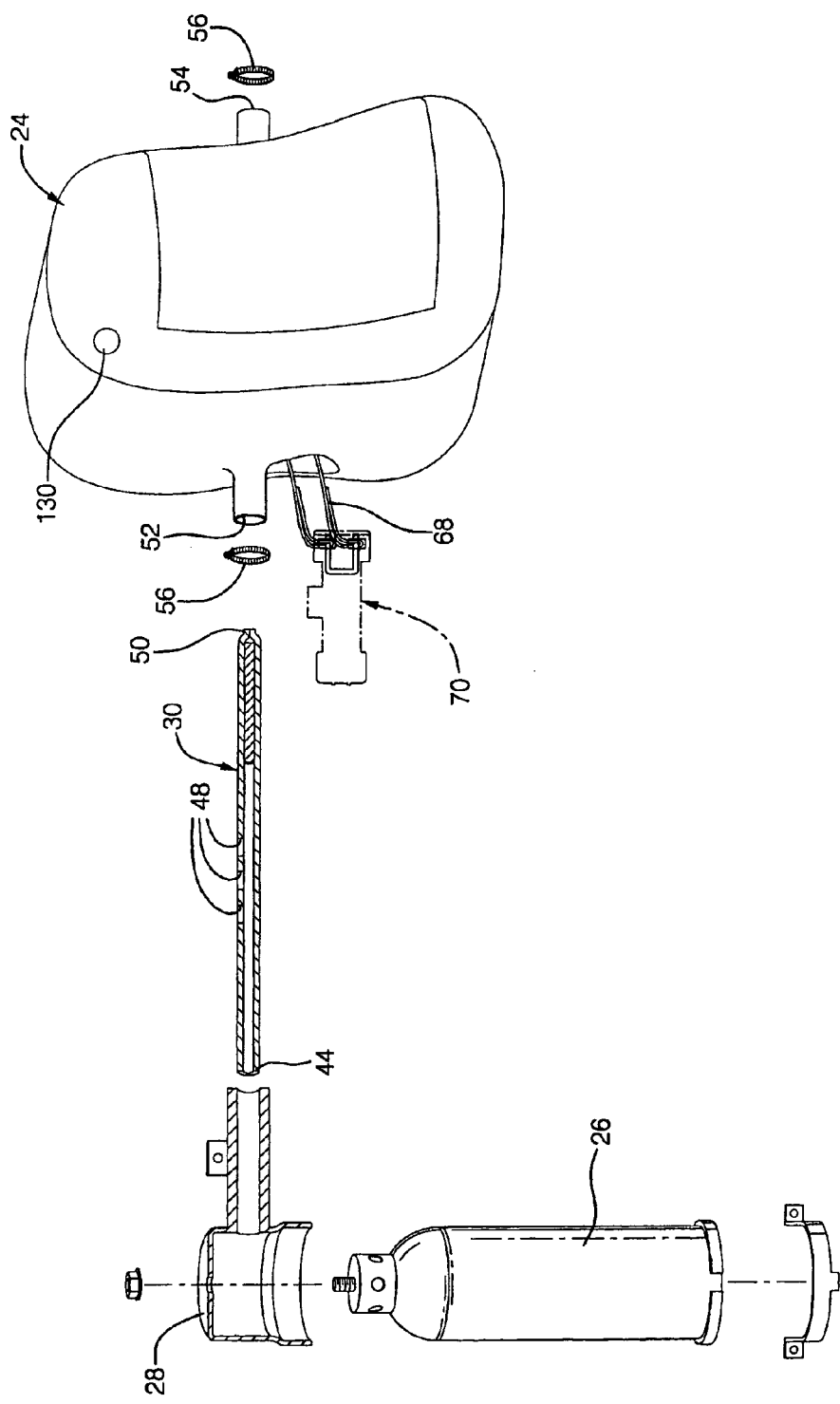
FIG. 3 is an expanded view of the air bag system.

The expanded views of FIGS. 2 and 3 illustrate the components of the air bag system 22. The system 22 includes a primary gas emitting inflator 26, which is in signaling communication with a triggering sensor (not shown) for sensing a vehicle impact of predetermined severity. The primary gas emitting inflator 26 emits inflation gas upon receiving such a signal of an impact. The gas is expelled into a plenum 28 and delivered through a fill tube 30 to an air bag module 32. The air bag module 32 includes the cushion 24 folded and packed within. The air bag system may be packaged in a housing 33.

As shown in FIG. 2, the passenger side door 20 packages the air bag system 22 which, in this configuration, is a frontal air bag system. The relative locations of components will be described with reference to vehicle directions i.e. forward refers to forward in vehicle. The primary inflator 26 is packaged preferably in a forward portion of the door 20 to support the mass of the inflator closer to the door hinges 34. This location also minimizes possible interaction between the passenger and the typically hard structure of the inflator. The air bag module 32 is packaged rearward of the inflator 26 in the door 20, thus necessitating the fill tube 30 to port gas therebetween.

The door 20 is comprised of a door outer panel 36, a door inner panel 38, and a trim panel 40. The air bag system 22 and housing 33 are packaged between the door inner panel 38 and trim panel 40.

The primary inflator 26 is installed into the plenum 28. The plenum may be cast, stamped, or molded out of a metallic or aluminum material, or may be several pieces welded together.

The fill tube 30 transports inflator gas directly from the inflator 26 or plenum 28 to the air bag module 32. The fill tube 30 as shown in FIG. 3 is a relatively straight tube having a plurality of radial openings 48 along its length.

Alternatively, the fill tube may include a straight portion with radial openings and also a curved portion upstream of the straight portion for changing the direction of the inflation gas. A first fill end 44 of the fill tube 30 is attached to the plenum 28. The attachment scheme may include a threaded, welded, brazed, or snap in joint likely with a secondary piece that is snapped into place to hold the plenum and fill tube together.

The fill tube 30 extends through fill tube openings 52,54 along an outboard portion of the cushion. The cushion 24 is attached to the fill tube 30 with clamps 56 at each of the fill tube openings 52,54.

Figure 4A:
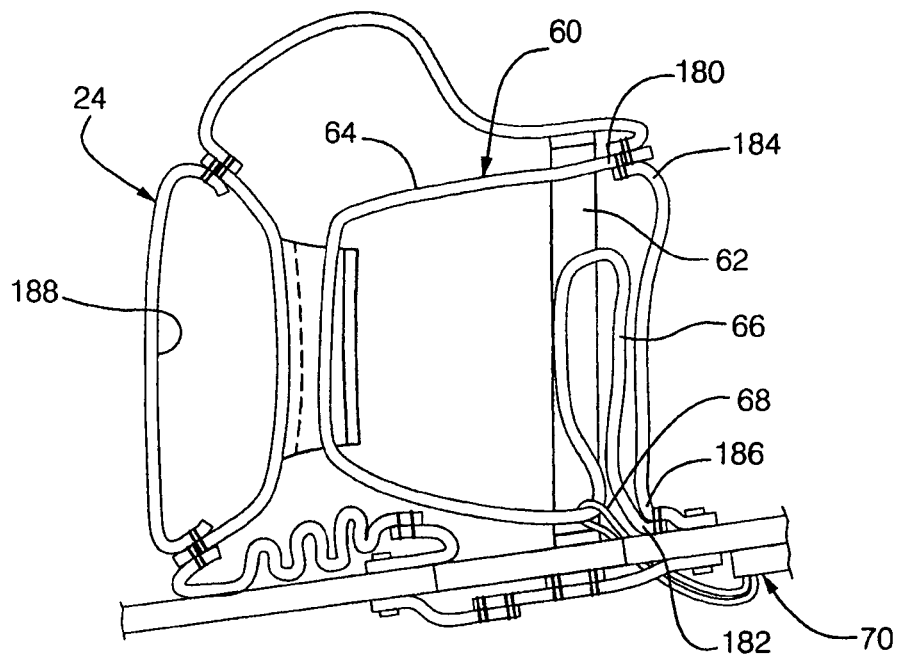
FIGS. 4A–B illustrate the tethers of the air bag system in the restricted and unrestricted positions.

The cushion includes at least one fore/aft tether 60 as shown in FIG. 4A and preferably two to control the depth of the deploying cushion. The cushion may also include one or more fixed lateral tether(s) 62 to restrict the lateral dimension of the deployed cushion. The tethers may be any suitable material, including that used to form the cushion.

The fore/aft tethers 60 have two effective lengths—a restricted length providing a first shallow depth deployed cushion and a second unrestricted length providing a second deep depth deployed cushion. In the first restricted position shown in FIG. 4A, the tether 60 is comprised of a loaded portion 64 and a slack portion 66. A retention feature such as a hook or loop 68 is attached to the tether 60 and designates the transition from the slack portion to the loaded portion. The tether loop 68 is releaseably retained by a dual depth mechanism 70, resulting in the slack tether portion. In the second unrestricted position shown in FIG. 4B, the tether loop 68 is released by the dual depth mechanism 70, allowing the slack portion to go taut and extending the tether to its full unrestricted length. The dual depth mechanism will now be described.

Figure 5A:
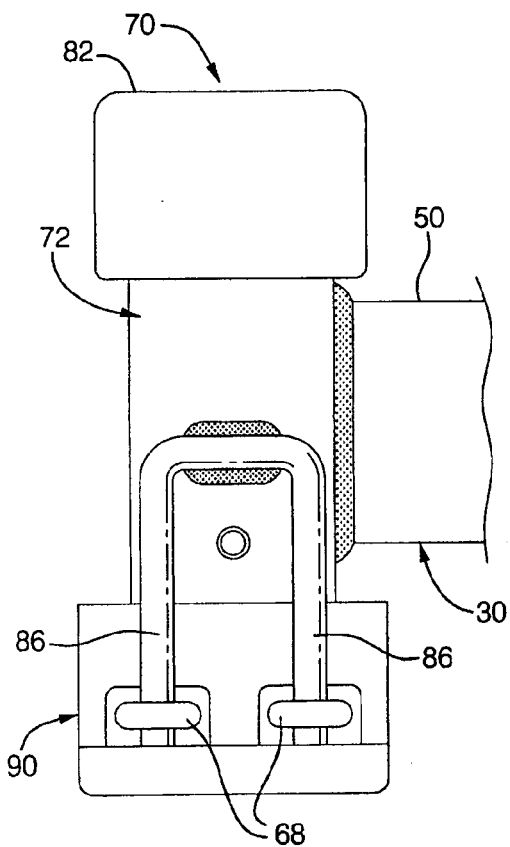
FIGS. 5A–C illustrate a first dual depth mechanism in its non-actuated position.
Figure 5B:
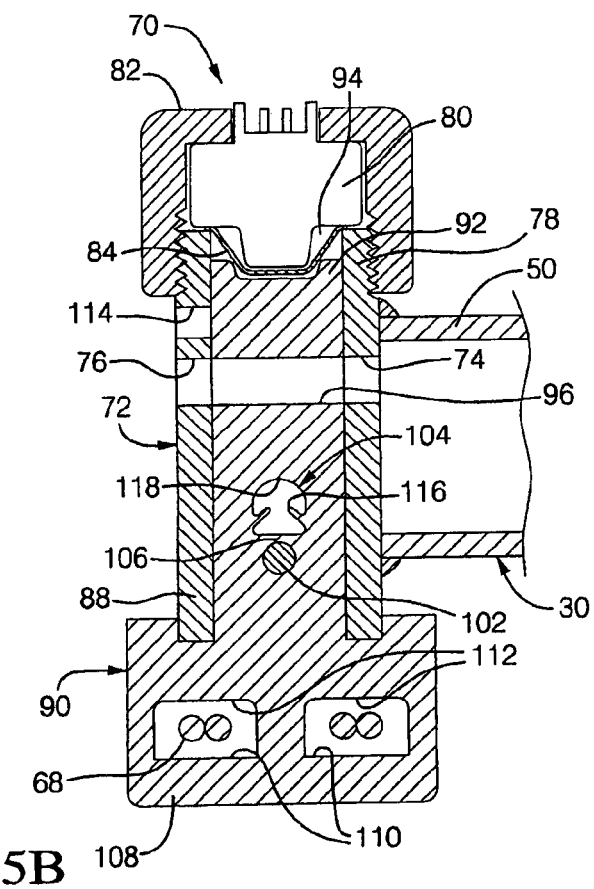
Figure 5C:
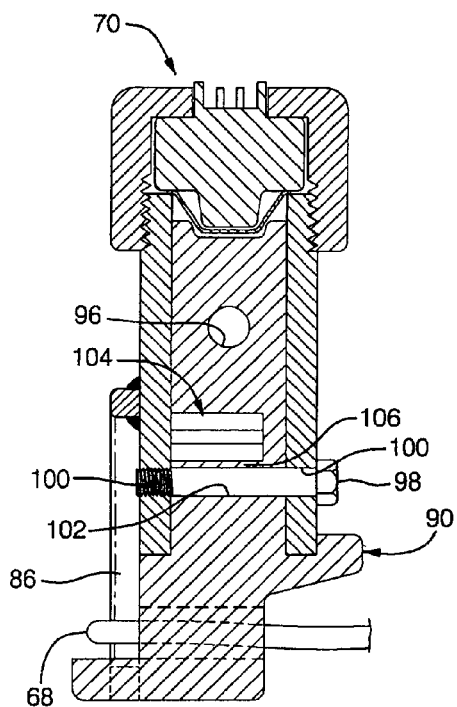

FIGS. 5A–C illustrate a dual depth mechanism 70 which is secured to a second downstream end 50 of the fill tube 30 and includes a cylindrical housing 72 arranged perpendicular to the fill tube and welded thereto. The housing 72 includes a pair of diametrically opposed openings where the first opening 74 is aligned with the fill tube end 50 and the second opening 76 vents to atmosphere.

An upper end 78 of the cylindrical housing is closed by an actuator 80, secured in place by a cap 82, which is crimped or threaded and secured to threads about the first end of the housing. One such actuator is a gas emission component, such as a canister of solid propellant wherein the propellant is conventionally ignited by an electrical signal. A spring washer 84 may be provided at the interface of the housing 72 and actuator 80 to prevent over clamping or rattling. Two studs 86 are fixedly secured to the exterior of the housing and extend beyond a lower end 88 of the cylindrical housing. The two studs may be formed of a U-shaped tubular member.

A solid cylindrical piston 90 is slidingly received partially within the cylindrical housing 72. In the piston's first non-actuated position, an upper end 92 of the piston is located adjacent the gas emission component 80, and in cooperation with the housing 72, encloses and defines a chamber 94 therebetween. A gas escape passage 96 through the piston 90 is aligned with the diametrically opposed openings 74,76 in the housing and therefore also with the fill tube 30 when the piston is in the first non-actuated position.

A fastener 98 extends through fastener holes 100 in opposite walls of the housing and through a fastener passthrough 102 in the piston to maintain the piston 90 in the non-actuated position. Positioned above the fastener passthrough 102 in the piston is a partial notched slot 104, partial in that it does not extend the full diameter but through approximately seventy-five percent of the piston diameter. A retention wall 106 extends between the fastener passthrough 102 and the notched slot 104.

A lower portion 108 of the piston extends beyond the housing 72 and includes two tether routing openings 110. During assembly, the tether loop is routed through the tether routing openings 110 in the piston 90 and looped on to a respective stud 86.

Figure 1B:
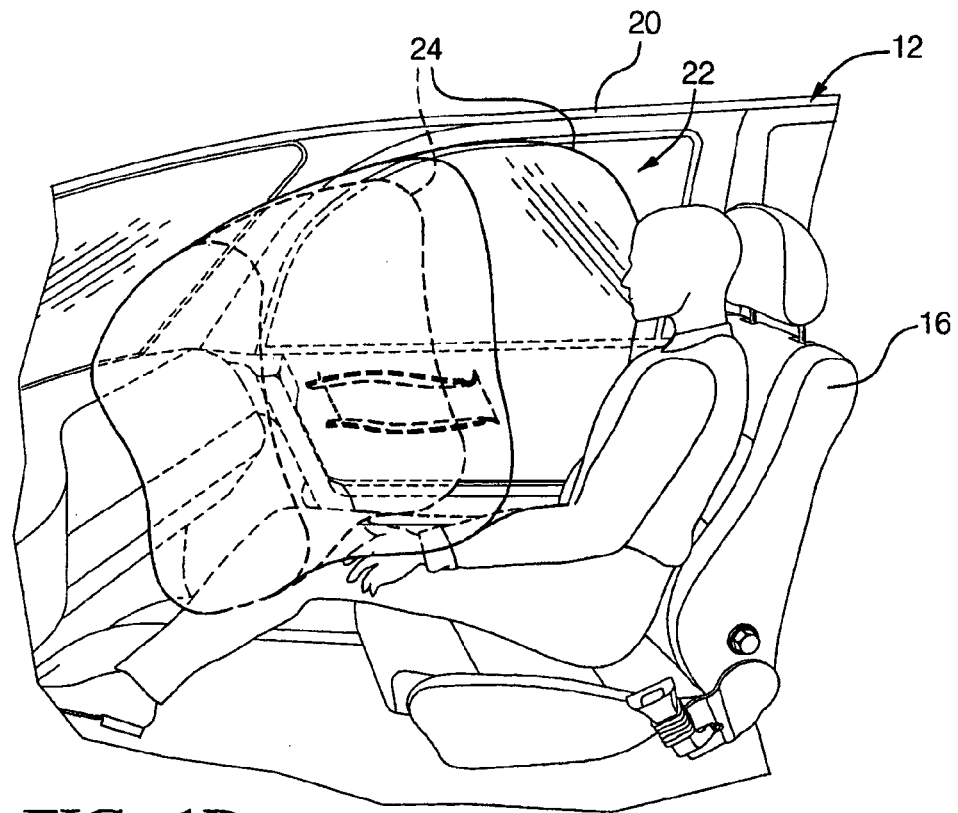
FIG. 1B is a schematic view of the interior of the vehicle with an air bag cushion of the present invention deployed (dashed line showing a shallow deployment.

In operation, the dual depth mechanism 70 may be actuated from its first, non-actuated state to its second, actuated state. In the first, non-actuated state shown in FIGS. 5A–C, the gas emitting component 80 does not release gas, the piston 90 remains in its first position, and the tether loops 68 are retained on the housing studs 86. In this non-actuated state, the slack is maintained and the tethers 60 operate to restrain the cushion 24, thereby providing a shallow deployed cushion shape, as shown in FIG. 1B. In addition, a portion of the cushion inflation gas delivered from the primary inflator 26 may be released through the downstream end 50 of the fill tube 30, the diametrically opposed openings 74,76 in the cylindrical housing, and the piston gas escape passage 96 to atmosphere.

Figure 6A:
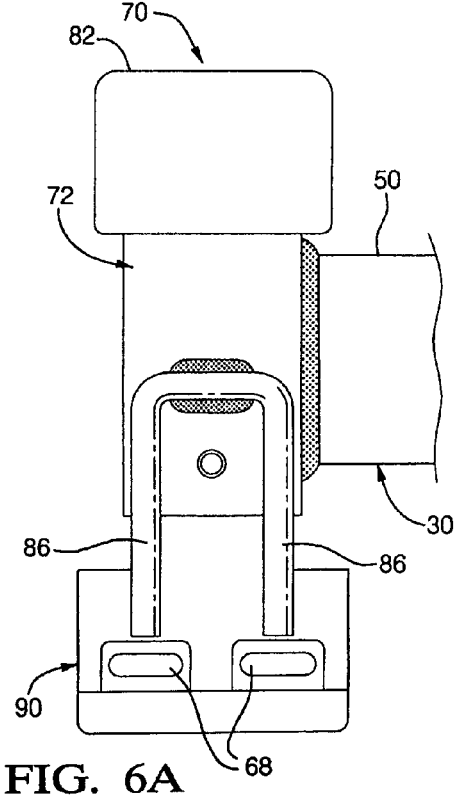
FIGS. 6A–C illustrate the dual depth mechanism of FIG. 5 in its actuated position.
Figure 6B:
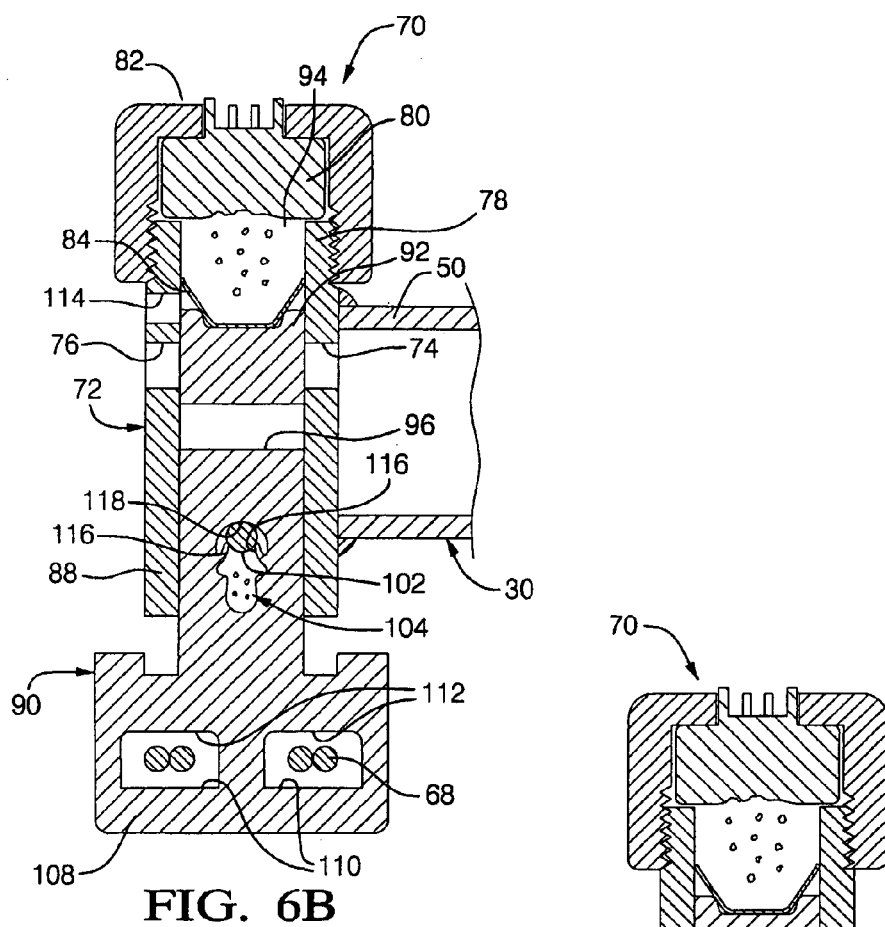
Figure 6C:
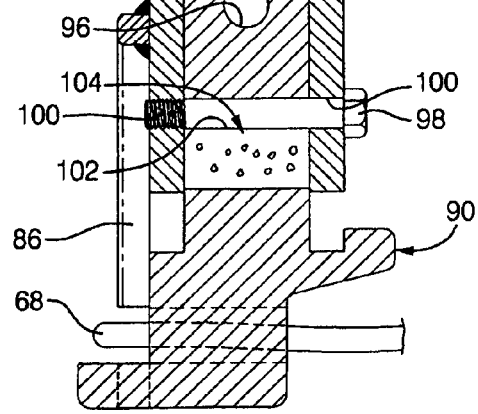

To achieve the second actuated state shown in FIGS. 6A–C, the gas emitting component 80 releases gas into the expandable chamber 94. The pressure builds to a predetermined point in which the piston 90 is displaced away from the gas emitting component 80 and the fixed fastener 98 separates the material of the piston retention wall 106 between the fastener passthrough 102 and the notched slot 104. As the piston 90 is displaced, the inner walls 112 of the tether routing openings 110 operate to "scrape" or strip the tether loops 68 off the housing studs 86, thereby allowing the tethers 60 to extend to their unrestricted length. This allows the cushion 24 to expand to its second, deep depth.

As the piston travels, it opens communication between the chamber 94 and a chamber vent 114 in the housing 72, allowing the gas in the chamber to vent. The chamber vent 114 may vent to atmosphere as shown or be arranged so that the chamber vent actually vents to the inside of the fill tube. Interference of the notches 116 in the slot 104 with the fastener 98 operate to slow down the piston 96 and interference with the back wall 118 of the slot operates to stop the piston. The washer 84 in the chamber 94 may act as an anti-bounceback feature to prevent the piston 90 from rebounding.

Upon deployment of the cushion, the piston 90 may or may not be actuated by the gas emitting component 80 depending on the desired manner of deployment of the air bag, which will be governed by whether certain predetermined conditions have been met. Thus, actuation of the piston may depend upon a sensing system that senses conditions inside or external of the vehicle in which the air bag system is installed. A sensing system may sense objects within the vehicle such as size or location of occupants, including a driver or a passenger, and send appropriate signals based thereon. Alternatively, the piston may be programmed to actuate automatically upon deployment of the air bag unless a signal from the sensing system signals non-actuation because of the conditions sensed.

Figure 7A:
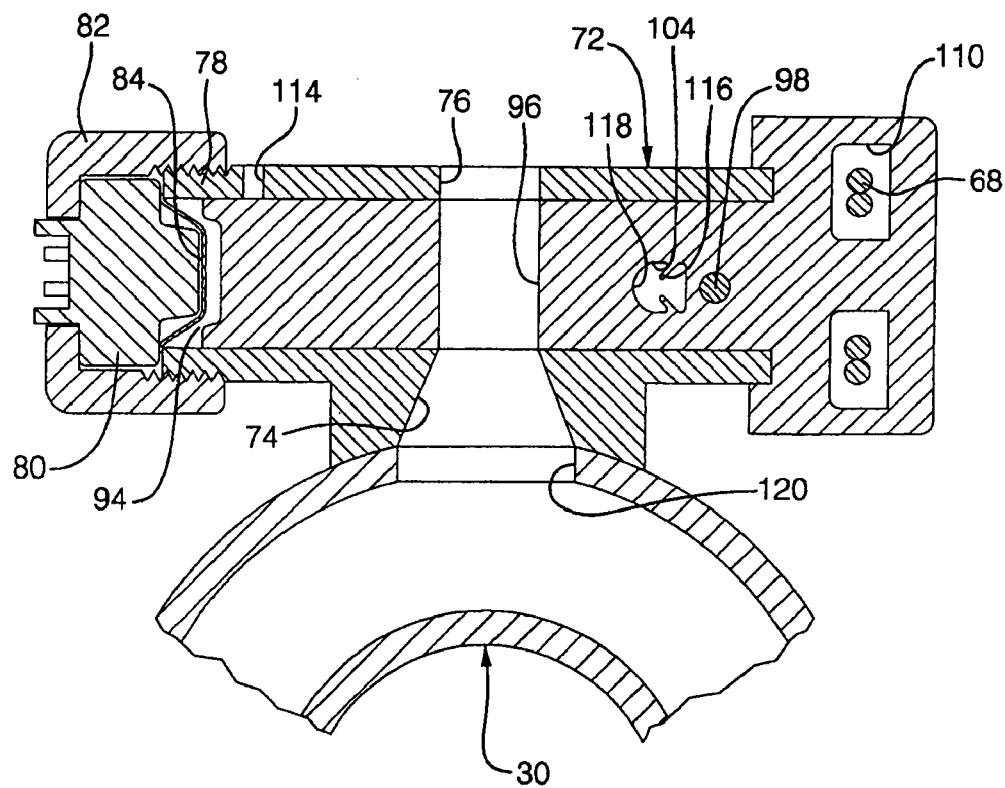
FIGS. 7A–B illustrate an alternative securement for the dual depth mechanism found in FIGS. 5A–C and in its non-actuated position.
Figure 7B:
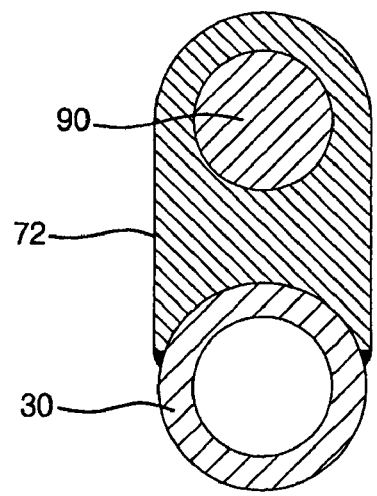

As illustrated in FIGS. 7A–B, the dual depth mechanism 70 previously described may alternatively be secured along the length of the fill tube 30 between the inflator 26 and the cushion 24 but preferably adjacent the first opening 52 to the cushion. (Like reference numerals are used). The cylindrical housing 72 may be cast or molded to conform to a curved portion of a fill tube as shown or to a straight tube. Here the cylindrical housing 72 is arranged tangentially adjacent to the curved fill tube 30 and welded or bonded thereto.

Instead of venting from the end of the fill tube as shown in FIG. 6, the fill tube 30 includes a radial vent 120 in alignment with the first housing opening 74. This allows inflator gas to be vented to atmosphere through the dual depth mechanism when the piston 90 is in the non-actuated position shown.

A second embodiment of a dual depth mechanism 130 will now be described in which the dual depth mechanism is integral with the plenum.

Figure 8:
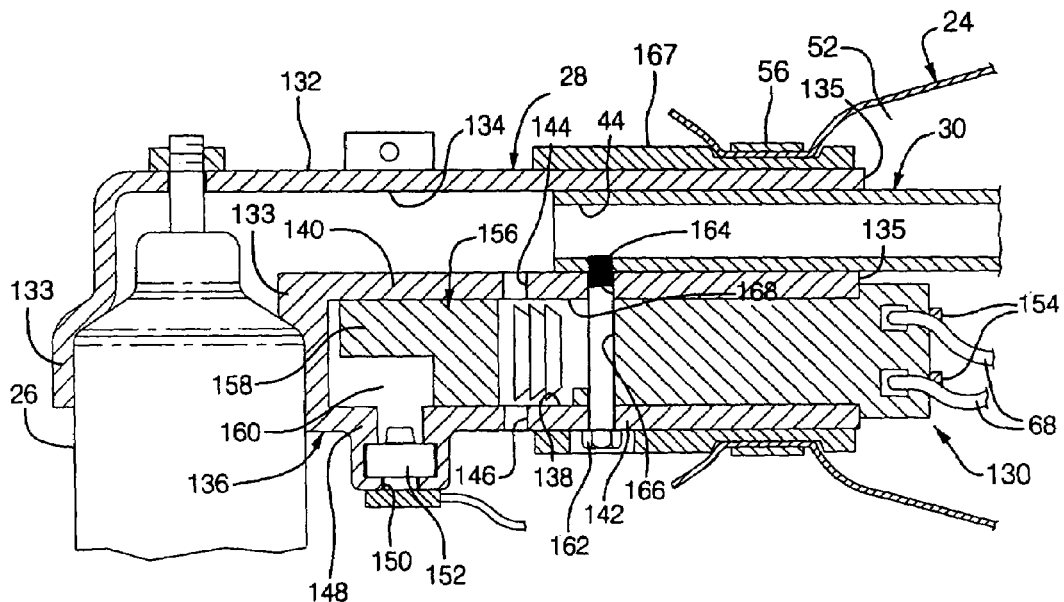
FIG. 8 illustrates a second dual depth mechanism in its non-actuated position.

Referring to FIG. 8, the plenum 28 includes an inflation gas portion 132 having an inflation gas passage 134 to fluidly connect the primary inflator 26 to the fill end 44 of the fill tube 30. The plenum 28 also includes a generally tubular piston housing portion 136, having a piston chamber 138 arranged approximately parallel to the inflation gas passage 134 and defined by a shared intermediate wall 140 and an exterior wall 142. The plenum 28 includes a pair of diametrically opposed vents with a first vent 144 in the intermediate wall 140 fluidly connecting the inflation gas passage 134 and the piston chamber 138 and a second vent 146 in the exterior wall 142 fluidly connecting the piston chamber 138 to atmosphere. The plenum may be cast or molded.

The plenum 28 defines, and may also be referred to as, a dual depth mechanism housing including a canister receiving portion 133, the inflation gas portion 132, and a fill tube receiving portion 135. The dual depth mechanism housing 28 further defines a piston receiving portion including the piston housing portion 136, the shared intermediate wall 140 and the exterior wall of the piston chamber 142, the piston chamber 160 and an exterior wall opening 150. The dual depth mechanism housing 28 may also include the first vent 144 and the second vent 146. As depicted in FIG. 8, the inflation gas portion 132, the shared intermediate wall 140 and the piston housing portion 136 are configured to receive the canister 26 and the fill tube 30.

A first end 148 of the piston housing includes the exterior wall opening 150, which is closed by an actuator 152 such as a gas emission component. It may be secured in place by a threaded cap or by crimping the flanges of the plenum. Two studs 154 are formed integral to the piston housing 136 and extend beyond an outer end of the piston chamber.

A solid cylindrical piston 156 is slidingly received partially within the piston chamber 138 of the piston housing 136. In the piston's first non-actuated position, an inner end 158 of the piston is located adjacent the gas emission component 152, and in cooperation with the piston housing 136, encloses and defines an expandable chamber 160 therebetween.

Figure 9A:
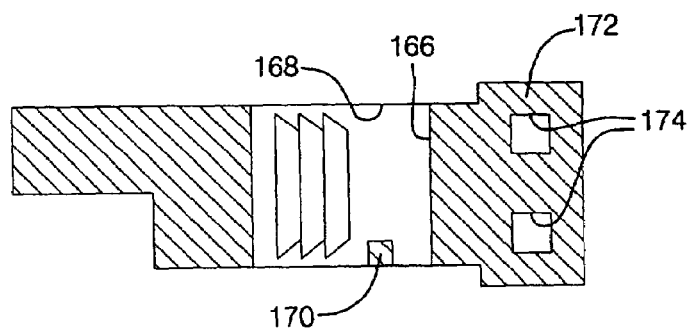
FIGS. 9A–B illustrate the piston of the dual depth mechanism of FIG. 8.
Figure 9B:
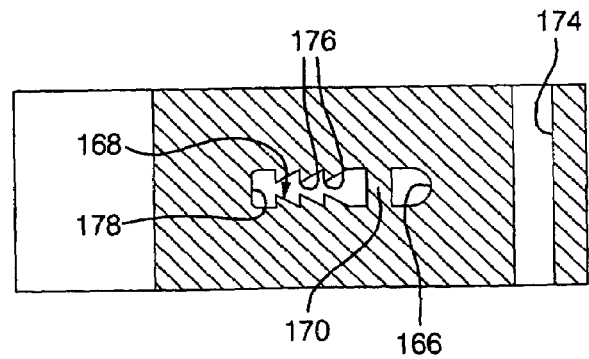

A fastener 162 extends through fastener holes 164 in the exterior and intermediate walls of the plenum and through a fastener passthrough 166 in the piston 156 to maintain the piston in the first position. Positioned adjacent the piston fastener passthrough 166 in the direction of the expandable chamber 160 is a notched slot 168, shown best in FIGS. 9A–B. A retention wall 170 extends between the fastener passthrough 166 and the notched slot 168. The notched slot 168 is aligned with the diametrically opposed vents 144,146 in the plenum 28 when the piston 156 is in the non-actuated position.

An outer portion 172 of the piston extends beyond the plenum 28 and includes two tether routing openings 174. During assembly, the tether loops 68 are routed through the tether routing openings 174 in the piston and looped on to a respective stud 154 of the piston housing 136.

In operation, the dual depth mechanism 130 may be actuated from its first, non-actuated state to its second, actuated state. In the first, non-actuated state shown in FIG. 8, the gas emitting component 152 does not release gas, the piston 156 remains in its first position, and the tether loops 68 are retained on the housing studs 154. In this non-actuated state, the tethers 60 operate to restrain the cushion 24, thereby producing a shallow profile deployed cushion, as shown in FIG. 1B. In addition, a portion of the cushion inflation gas delivered from the primary inflator 26 through the plenum inflation passage 134 is diverted through the diametrically opposed vents 144,146 in the piston housing 136 and the piston slot 168 to atmosphere providing the proper internal cushion pressure for the resulting volume. The retention wall 170 has sufficient structural integrity to remain intact as it is forced against the fastener 162 by the diverted inflator gas and the pulling action of the tethers 60 as they restrain the inflated cushion 24.

To achieve the second actuated state shown in FIG. 10, the gas emitting component 152 releases gas into the expandable chamber 160. The pressure builds to a predetermined point in which the piston 156 is displaced away from the gas emitting component 152 and the fixed fastener 162 separates the material of the piston retention wall 170 between the fastener passthrough 166 and the notched slot 168. As the piston 156 is displaced, the inner walls of the tether routing openings 174 operate to "scrape" or strip the tether loops 68 off the housing studs 154, thereby releasing the tether loops. This allows the cushion 24 to expand to its second deep depth.

As the piston 156 travels, it blocks the first vent 144 in the intermediate wall 140 so that all the inflation gas travels through the inflation passage 134 to the cushion 24. The second vent 146 in the exterior wall 142 of the plenum 28 is blocked during initial piston travel, but is unblocked when the piston 156 is in the actuated position so that gas in the expandable chamber 160 vents therethrough to atmosphere. Alternatively, the piston could be configured to vent the chamber gas through the first vent 144 to the inflation gas passage 134. Interference of the notches 176 in the slot 168 with the fastener 162 operate to slow down the piston 156 and interference with the back wall 178 of the slot operates to stop the piston. The slot notches 176 also provide an anti-bounce back function to the piston.

Figure 21A:
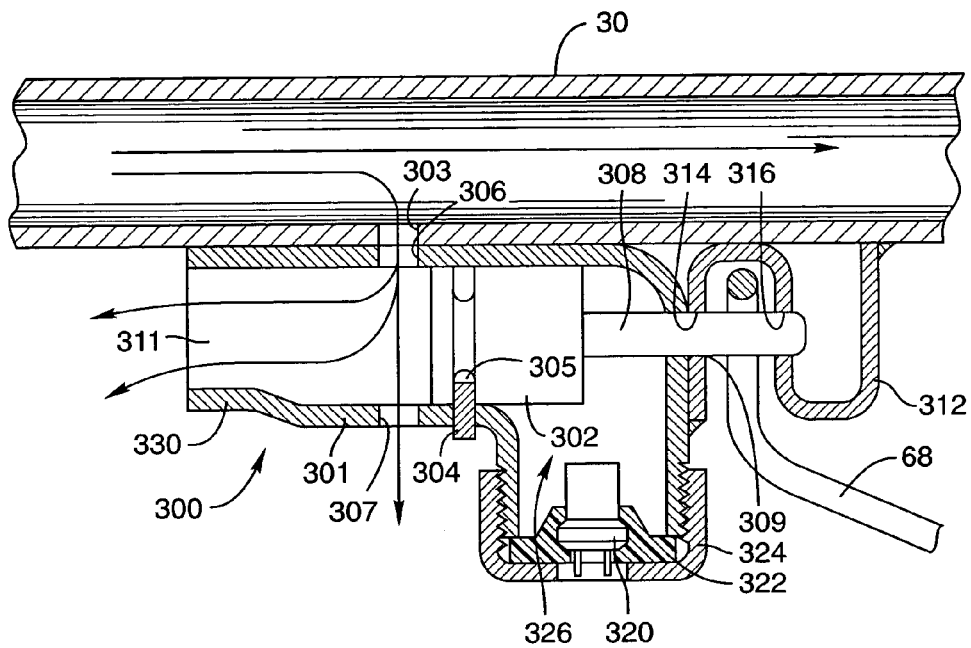
FIG. 21A illustrates a third dual depth mechanism in its non-actuated position.
Figure 21B:
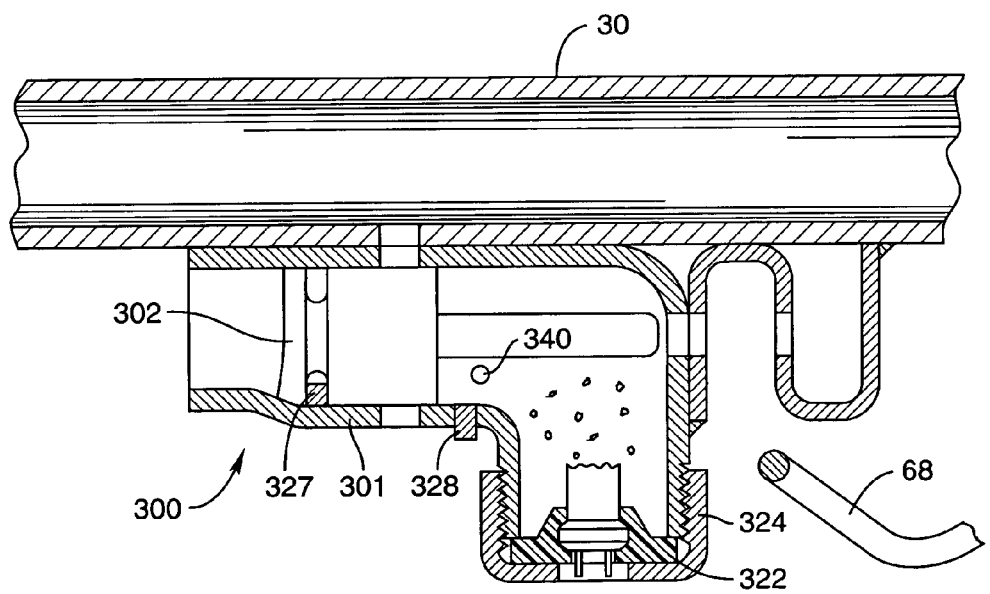
FIG. 21B illustrates the dual depth mechanism of FIG. 21A in its actuated position.
Figure 21C:
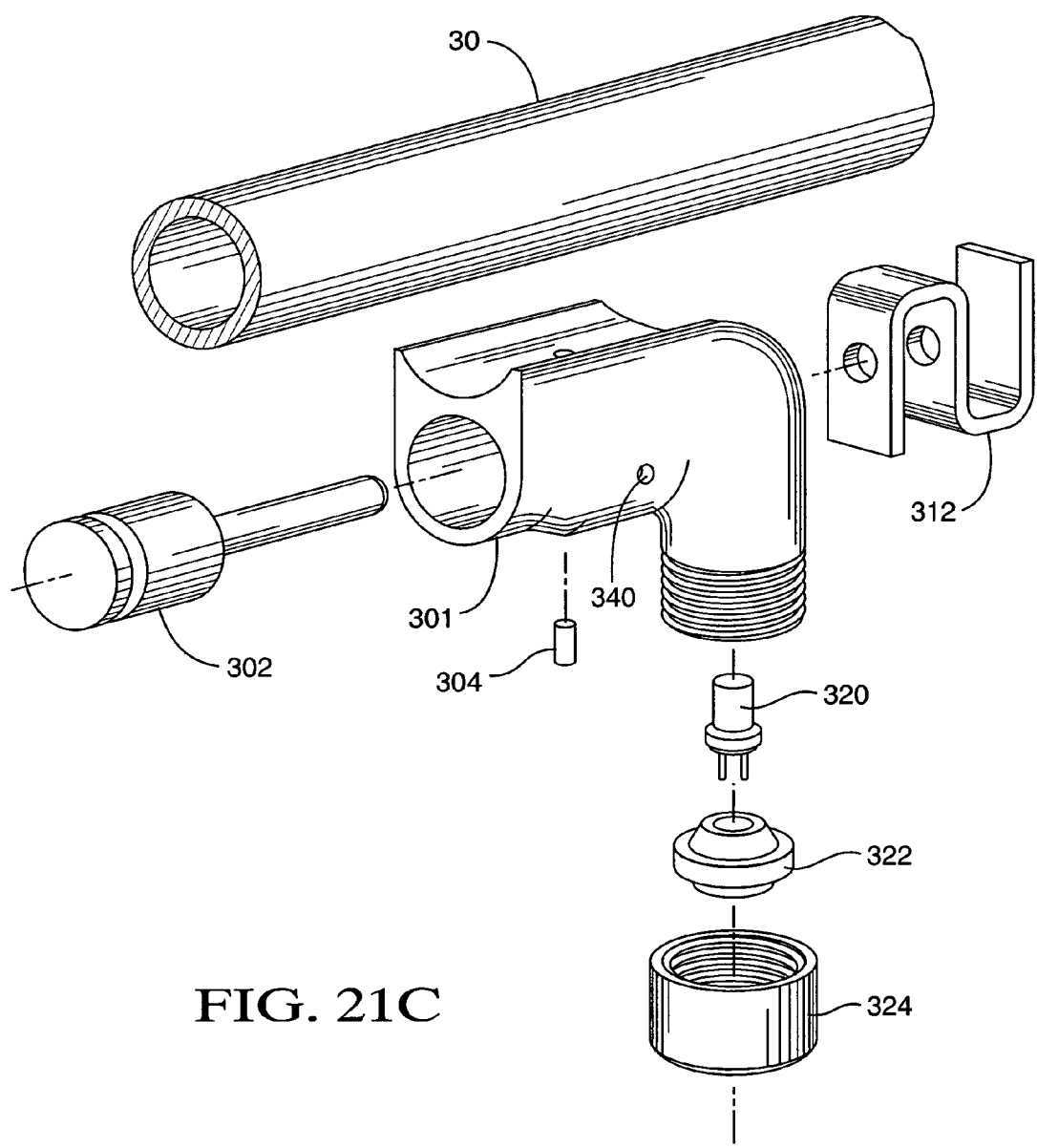
FIG. 21C is an expanded or exploded view of the dual depth mechanism of FIGS. 21A–B.

A third embodiment of a dual depth mechanism 300 shown in FIGS. 21A–C will now be discussed. FIG. 21A shows a fill tube 30 with a dual depth mechanism 300 secured along the length of the fill tube 30. An L-shaped piston housing 301 contains a piston 302 that is retained in place by a retention member 304 which, in this case, is a pin, nested in a retention slot 305 formed in the piston 302. When the piston is in a non-actuated state, as shown in FIG. 21A, a fill tube vent 303 is in fluid communication with diametrically opposed vents 306, 307 and vent 311 in the housing 301. The piston 302 has a stud portion 308 that protrudes through hole 309 in the housing 301 around which an air bag cushion external tether loop 68 is mounted. One or more tether loops 68 may be routed around the stud portion 308. An extension 312 is located adjacent to the housing 301 and formed with first and second extension openings 314, 316, respectively. The piston stud portion 308 rests within openings 314, 316 in the extension 312 when the piston 302 is in a non-actuated state. When the piston 302 is in a non-actuated state, as is shown in FIG. 21A, the air bag cushion external tether loop 68 is retained on the piston stud portion 308.

An actuator 320, such as a gas emitting inflator or initiator is also housed in the housing 301. An actuator holder 322 and a threaded or crimped on cap 324 may be used to attach the actuator 320 to the housing 301. Upon deployment, as depicted in FIG. 21B, the actuator 320 will generate gas in chamber 326 formed by the actuator 320, the actuator holder 322, the housing 301 and the piston 302. The gas will fracture the retention member 304 into pieces 327, 328 and the expanding chamber 326, will propel the piston 302 down the housing 301 until it hits the piston stop 330.

As the piston 302 travels down the housing 301, the piston stud portion 308 is pulled through hole 309 in the housing 301. As this occurs, the air bag cushion tether loop 68 is scraped or stripped off and released from the piston stud portion 308. In addition, the piston 302 travels down the housing 301, the piston 302 blocks vent hole 306, which is aligned with radial vent 303 in fill tube 30 and normally allows gas to pass from the fill tube 30 to outside atmosphere through vent holes 307, 311.

An optional piston slow down feature, vent 340 acts to slow the piston 302 before it contacts the piston stop 330. The tapered wall on piston stop 330 can also act as a slow down feature for the piston 302. The vent 340 in the housing 301 is blocked by the piston 302 when the piston 302 is in a non-actuated position and is unblocked when the piston 302 moves to an actuated position. The vent 340 vents the gas generated in the chamber 326 by the actuator 320 to outside atmosphere. It is also possible to locate vent 340 so that the actuator gas is vented to inside the fill tube 30.

Figure 22A:
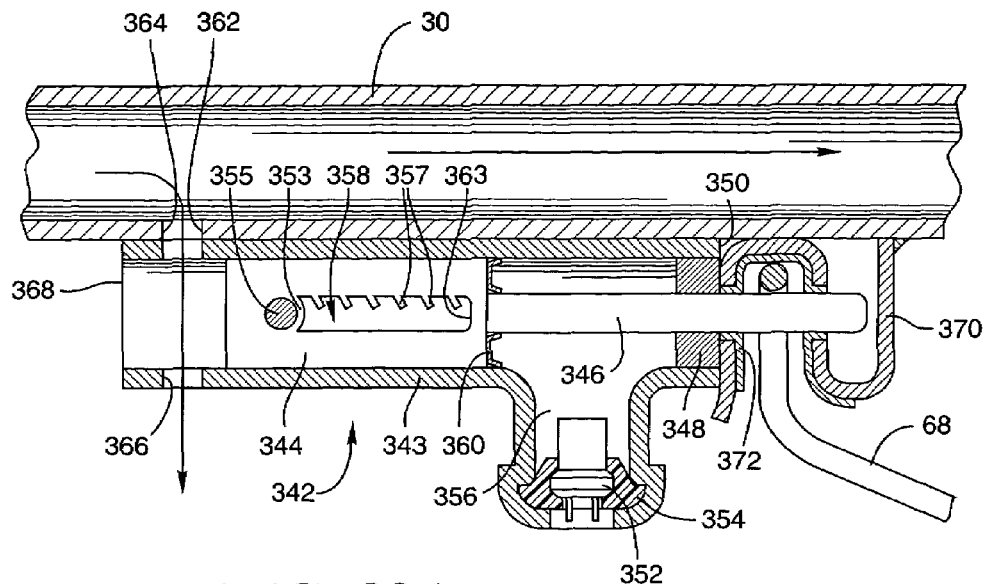
FIG. 22A illustrates a fourth dual depth mechanism in its non-actuated position.
Figure 22B:
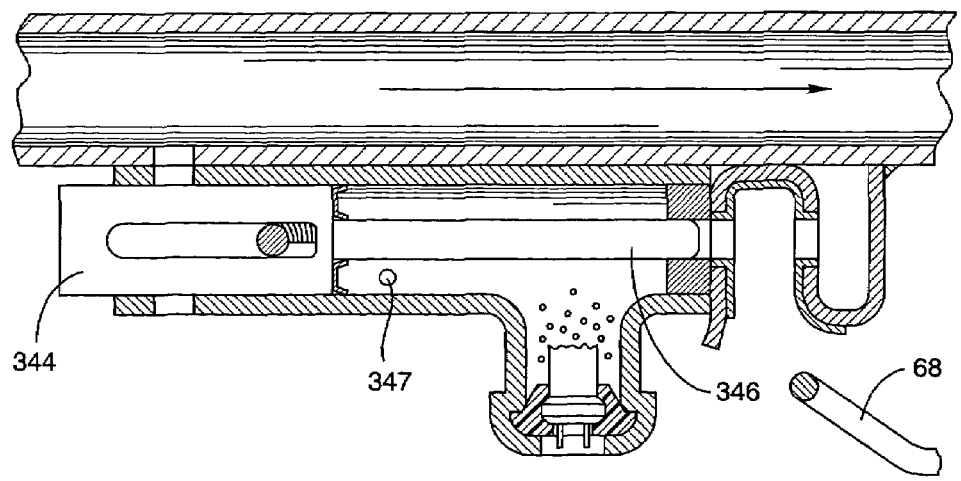
FIG. 22B is an illustration of the dual depth mechanism of FIG. 22A in its actuated position.
Figure 22C:
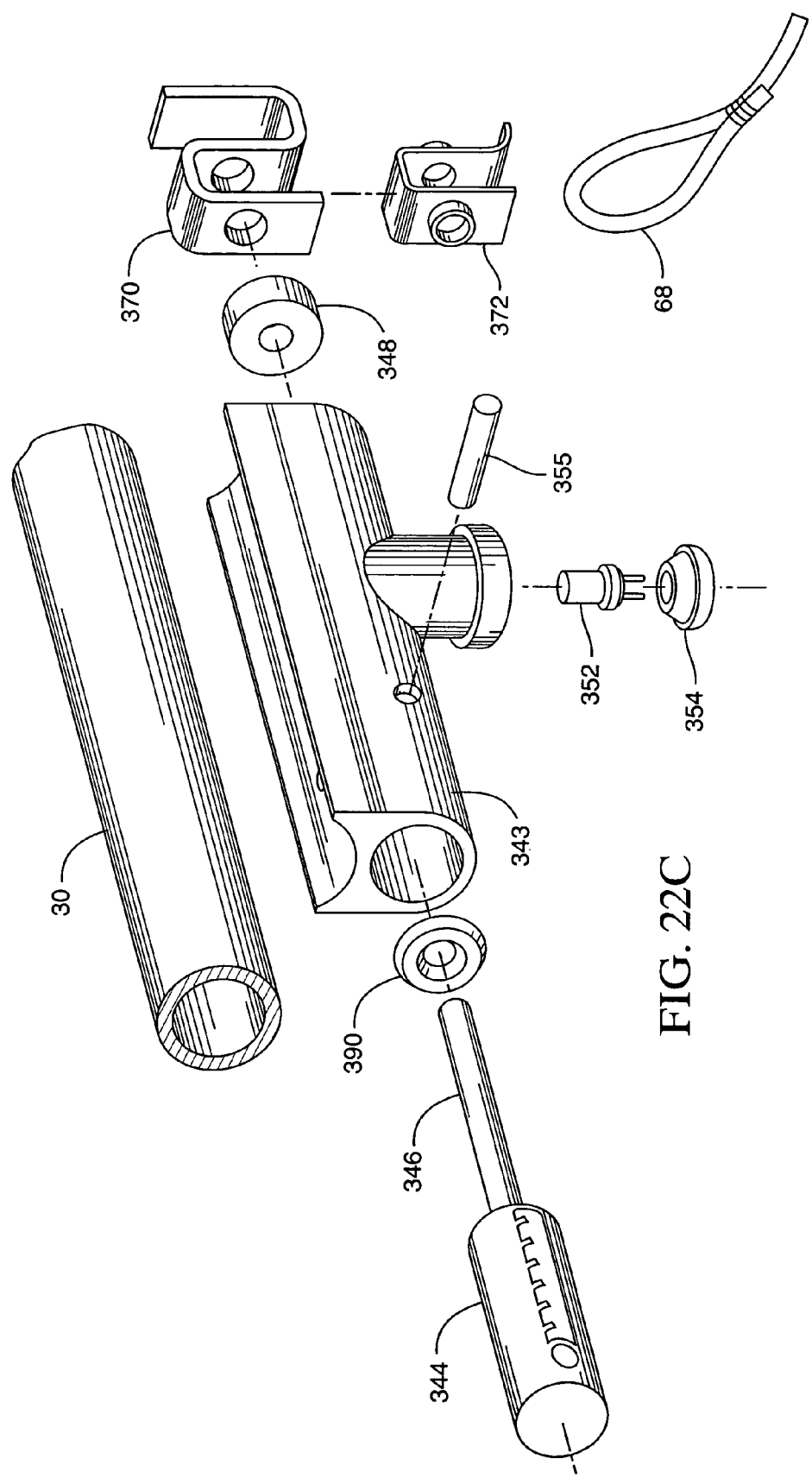
FIG. 22C is an expanded or exploded view of the dual depth mechanism of FIGS. 22A–B.

A fourth embodiment of a dual depth mechanism 342 is shown in FIGS. 22A–C. In FIG. 22A, a "T" shaped piston housing 343 is shown (as opposed to "L" shaped as in the housing 301 shown in FIG. 21A). A piston 344 having a stud portion 346 is held in the housing 343. A stud end plug 348 blocks a stud end 350 of the housing 343 where the stud portion 346 protrudes. An extension 370 is attached to the fill tube. The extension 370 is configured to receive the stud portion 346 when the piston 344 is in the non-actuated position. Thus, when the tether loop 68 is placed around the stud portion 346 and the stud portion is then placed in the extension 370, the tether is retained on the stud. An optimal extension support 372 may be used to provide a smooth surface for the tether 68 to interact against.

An actuator 352 is held in an actuator holder 354. The actuator holder 354 is crimped in the housing 343. A piston chamber 356 is formed in the housing 343 and is bounded by the piston 344, the plug 348, the actuator holder 354 and the actuator 352.

A retention member 355 is a through pin or a bolt that is adjacent to a retention wall 353 in the piston 344. The retention wall 353 separates the through pin 355 and a piston slot 358 formed in the piston and is designed to break as the piston moves to the actuated state. The piston slot 358 is formed with optional notches 357, a slow down feature designed to slow travel of the piston 344 during travel to the actuated position shown in FIG. 27B. The notches 357 are designed to break off during piston travel. Upon actuation, as shown in FIG. 22B, the retention wall 353 separates or breaks allowing the piston 344 to travel to the actuated position. Alternatively, the through pin 355 may be retained by a retention wall formed in the housing 343. In such a configuration, the retention wall would separate, allowing the through pin to travel with the piston to the actuated position.

A washer 360 may be mounted to a chamber-side end 363 of the piston 344. The washer 360 is designed to expand when contacted by actuator gas. During actuation and when the piston reaches an actuated position, the washer 360 acts as a reverse travel prevention feature.

When the piston 344 is in a non-actuated position, emitter gas in fill tube 30 is in fluid communication with fill tube vent 362 and aligned, diametrically opposed housing vents 364, 366 as well as housing opening 368. Alternatively, housing opening 368 may be sealed with a cap or plug. When the piston 344 moves to an actuated position as shown in FIG. 22B, the piston 344 blocks fill tube vent 362, thus directing fill tube gas down the fill tube 30 toward the cushion (not shown). An optional vent 347 may be formed in the housing 343. The vent 347 gets to vent actuator gases to outside atmosphere or to inside the fill tube 30 when the piston 302 moves to an actuated position, similar to vent 340 discussed with respect to FIG. 21B.

A fifth embodiment of a dual depth mechanism 400 is shown in FIGS. 23A–B. In this embodiment, a "T"-shaped housing 401 is vertically oriented and welded to the fill tube 30 at the fill-tube side 402. A piston 403 has a forward stud portion 406 as well as a rearward stud portion 408. The rearward stud portion 408 extends through a stud hole 410 formed in a stud cap 412 located at a tether side end 414 of the housing 401. An extender cap or strap 416 is welded, crimped or otherwise fastened to the stud cap 412. A hole 418 in the extender cap 416 supports the rearward stud portion 408 when the piston 403 is a non-actuated position. A tether loop 68 is routed around the rearward stud portion in the extender strap 416.

The piston 403 is held in the non-actuated position by a retention member pin 404 nested in a retention slot 422 formed in the piston 403. A piston chamber 424 is formed by the housing 401, an actuator 426 and an actuator holder 428 which is crimped or otherwise attached to the housing 401.

When the actuator 426 emits gas into the chamber 424, the retention member pin 403 is broken into pieces 430, 432 and the piston 403 is moved in the housing 401 toward the fill tube 30. An optional finger 434 acts as a piston stop when the piston 403 reaches the actuated position shown in FIG. 23B. Additionally, notches 436 in the housing 401 act to retain flanges 438 formed on a chamber-side end 440 of the piston 404. The flanges 438 also act as a reverse travel prevention feature.

In the actuated position, the forward stud portion 406 blocks a vent 442 in the fill tube 30 preventing escape of emitter gas to the atmosphere. Upon actuation, the rearward stud portion 408 is moved up through the extender strap 416. The outer wall 441 of the extender cap 412 scrapes or strips the tether loop 68 from the rearward stud portion 408, releasing the tether loop 68.

Figure 24C:
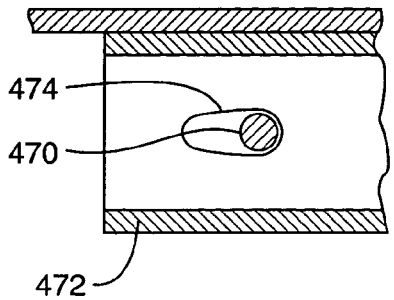
FIGS. 24C–24F are illustrations of alternative piston stops and piston slow down features for use in a dual depth mechanism.

Alternative design features for a dual depth mechanism are shown in FIGS. 24A–G. As depicted in FIG. 24A, an integral housing 450 having a fill tube portion 452, a piston chamber portion 454 and an extension portion 456 may be employed.

As depicted in FIG. 24B, a piston 460 having an integral actuator 462 may be employed. The piston 460 would be formed with an actuator holder 464 as well as a vent hole 466 through which actuator gas would vent during actuation.

FIGS. 24C–J show some alternative designs for piston stops and for slow down features. In FIG. 24C, a through pin or bolt 470 is extended through the housing 472. A deformable slot 474 is formed in housing 472. When a piston (not shown) moves to an actuated position, it will force the bolt 470 to travel in the slot 474. The taper of the slot 474 will act to slow movement of the bolt 470 and the piston.

Figure 24D:
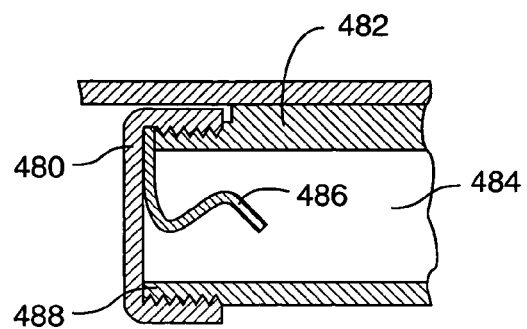

FIG. 24D shows a cap 480 welded to housing 482. The cap 480 acts to stop a piston (not shown) moving toward it in the piston chamber 484. A deformable intermediate member 486 attached to the cap 480 helps to slow the piston before it reaches the cap 480. Alternatively, a strap across the cap-side end 488 of the housing 482 would perform the same function as the cap 480.

Figure 24E:
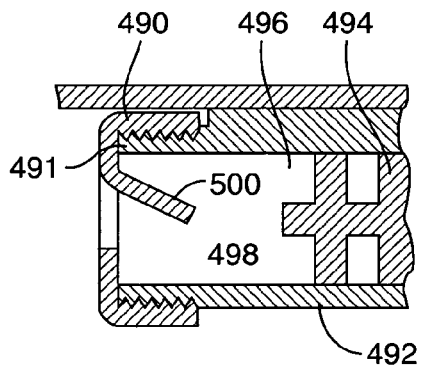

FIG. 24E shows a threaded cap 490 that mates with a threaded portion 491 of housing 492. The threaded cap 490 acts as a piston stop when piston 494 moves toward it in piston chamber 496. The piston 494 is formed with a deformable element 498 designed to deform upon contact with the threaded cap 490, acting as a piston slowdown feature. Additionally, the threaded cap 490 may include a deformable feature 500 that also acts to slow the piston 498.

Figure 24F:
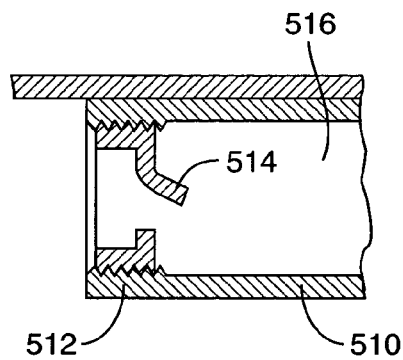

FIG. 24F shows a threaded housing 510 mated with a threaded plug 512 at one end. The threaded plug 512 is formed with a deformable feature 514 designed to slow a piston (not shown) moving toward it in piston chamber 516.

Figure 24G:
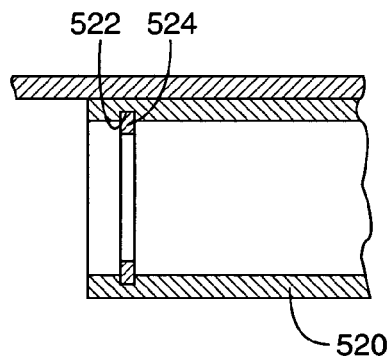
FIG. 24A is an illustration of an integral fill tube and housing for a dual depth mechanism.
FIG. 24B is an illustration of a piston for a dual depth mechanism, the piston having an integral actuator.
Figure 24H:
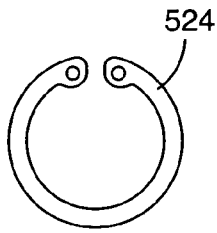
Figure 24I:
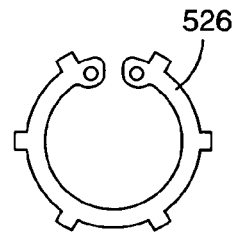

FIG. 24G shows a housing 520 formed with slots 522 configured to hold an internal cap ring 524. The internal cap ring 524 may have a smooth circumference as shown in FIG. 24H or may be formed with tabs 526 configured to fit within slots 522, as depicted in FIG. 24I.

Figure 24J:
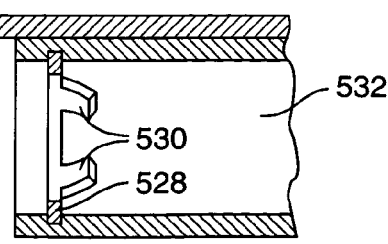

FIG. 24J depicts a deformable clip ring 528 formed with fingers 530 extending into piston chamber 532. During contact, the fingers 530 are designed to deform and thereby slow a piston (not shown) moving toward the clip ring 528 in the chamber 532.

The discussion will now turn to the securement and routing of the tethers through the cushion. Each tether configuration may be used with any of the dual depth mechanism designs described above.

Figure 4B:
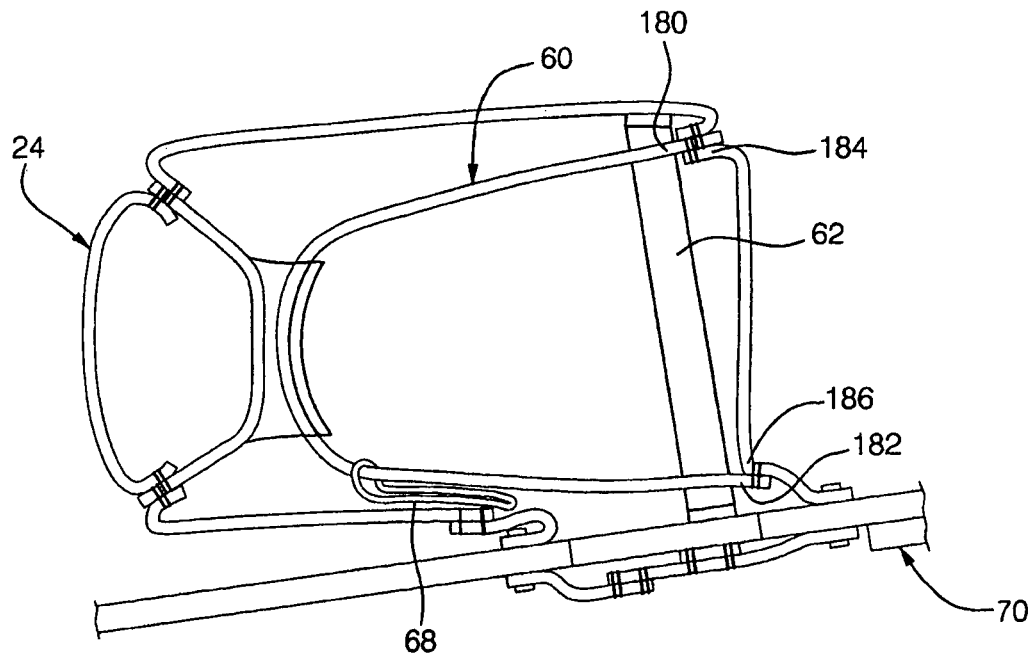

As shown in FIGS. 4A–B, the first and second ends 180,182 respectively of the tether 60 are fixed to laterally opposing and forward in the vehicle portions 184,186 of the cushion. Or instead of both ends of the tether being fixed, the second end 182, adjacent the tether loop 68 may be free such that when the dual depth mechanism 70 is actuated, the tether is released. The cushion 24 may expand to its full depth without restriction from the fore/aft tethers 60.

The loaded portion of the tether may be routed through the internal, rearward portion 188 of the cushion in various ways. The rearward portion of the cushion is the panel that interacts with the passenger.

Figure 13:
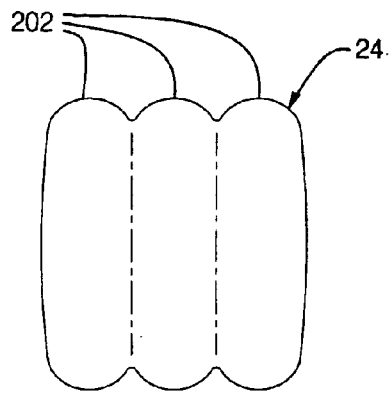
FIG. 13 is a view of a deployed cushion from the passenger's viewpoint.

As shown in FIG. 11, the rearward portion 188 includes an internal panel 190 fixed to the rearward portion along its two vertical edges 192. A horizontally oriented tubular slot 194 is formed by fixing a secondary panel 196 to the internal panel 188 along its two horizontal edges 198. The tubular slot 194 may also be formed by folding over and fixing to itself flaps 200 from the internal panel 190 as shown in FIG. 12. The tether is routed through the tubular slot. Thus upon restrained cushion deployment, the tether creates three vertical bulges 202 in the deployed shallow depth cushion as shown in FIG. 13.

Figure 14:
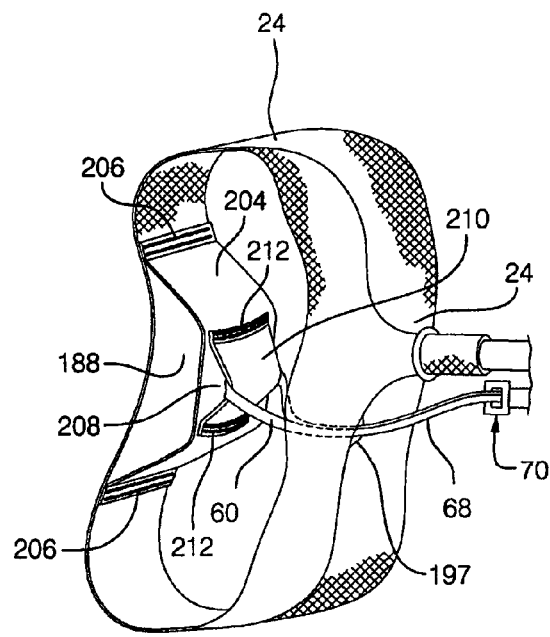
FIG. 14 illustrates another tether routing scheme with part of the cushion cut away.
Figure 15:
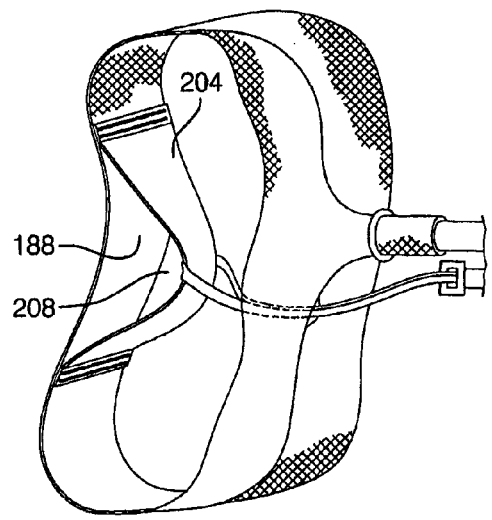
FIG. 15 illustrates another tether routing scheme with part of the cushion cut away.
Figure 16:
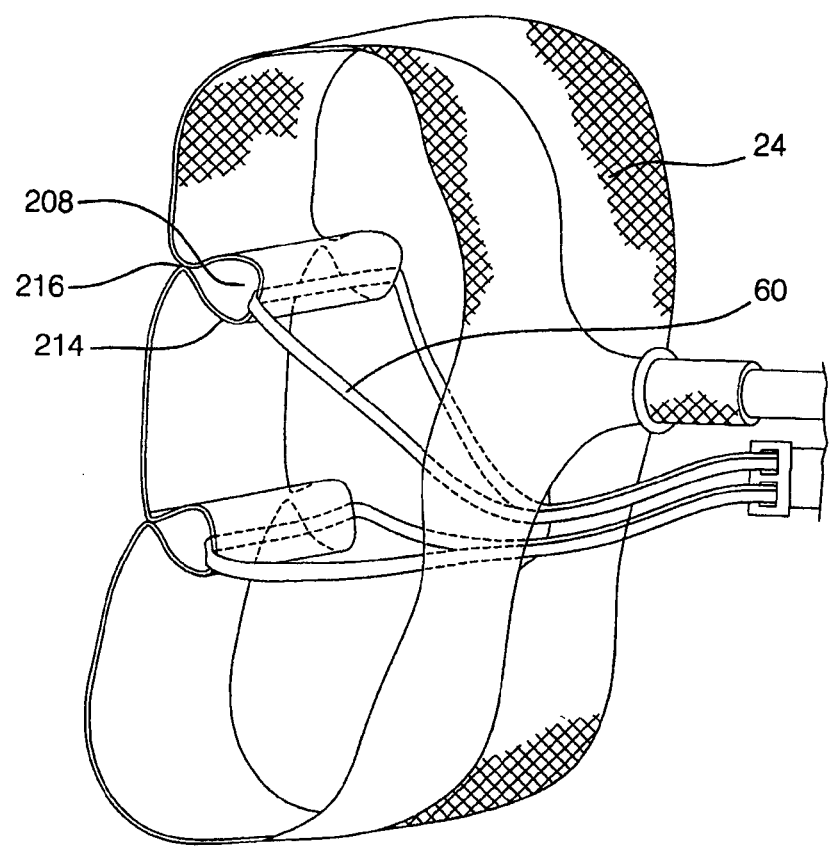
FIG. 16 illustrates another tether routing scheme with part of the cushion cut away.
Figure 17:
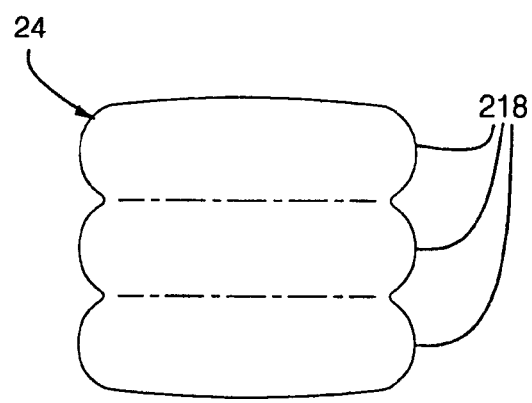
FIG. 17 is a view of a deployed cushion from the passenger's viewpoint.

In the embodiment shown in FIG. 14, an internal panel 204 is fixed to the rearward cushion portion 188 along its two horizontal edges 206. A horizontally oriented tubular slot 208 is formed by fixing a secondary panel 210 to the internal panel 204 along its two horizontal edges 212. The tubular slot 208 may also be created simply between the internal panel 204 and the rearward portion 188 of the cushion, as shown in FIG. 15. A further construction may be to create a tubular slot 208 by forming an internal pleat 214 with the rearward portion 188 of the cushion and fixing it along a horizontal seam 216 as shown in FIG. 16. The tether 60 is routed through the tubular slot 208. Thus upon restrained deployment, the tether creates three horizontal bulges 218 in the deployed shallow depth cushion as shown in FIG. 17. Two tubular slots may be employed as shown in FIG. 16 for two tethers. The two tethers may actually be constructed of a single length of fabric doubled at either fixed tether end.

The dual depth mechanism, as previously described, may be packaged such that the tether loops extend outside the cushion as shown in FIG. 5A. The tether loop is routed through a cushion opening 197 as shown in FIG. 14 to the dual depth mechanism. Alternatively, as shown in FIG. 8, the tether 68 may route completely inside the cushion 24 to the dual depth mechanism 130. The cushion end 52 is clamped by clamp 56 to the dual depth mechanism 130 intermediate the tether loop 68 to the piston studs 154 and the second vent 146. An optional filler piece 167, likely made of plastic, may be included to provide a gas seal between the cushion 24 and the dual depth mechanism 130. In this manner, inflator gas is still vented through second vent 146 outside the cushion 24 when the dual depth mechanism 130 is not actuated.

Figure 18:
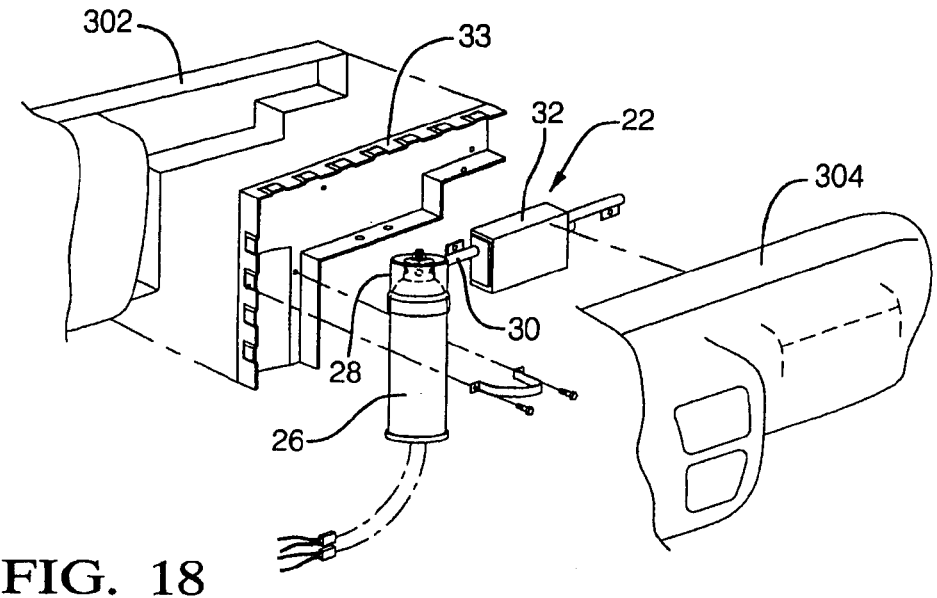
FIG. 18 is an expanded view of the instrument panel with the air bag system of the present invention.
Figure 19:
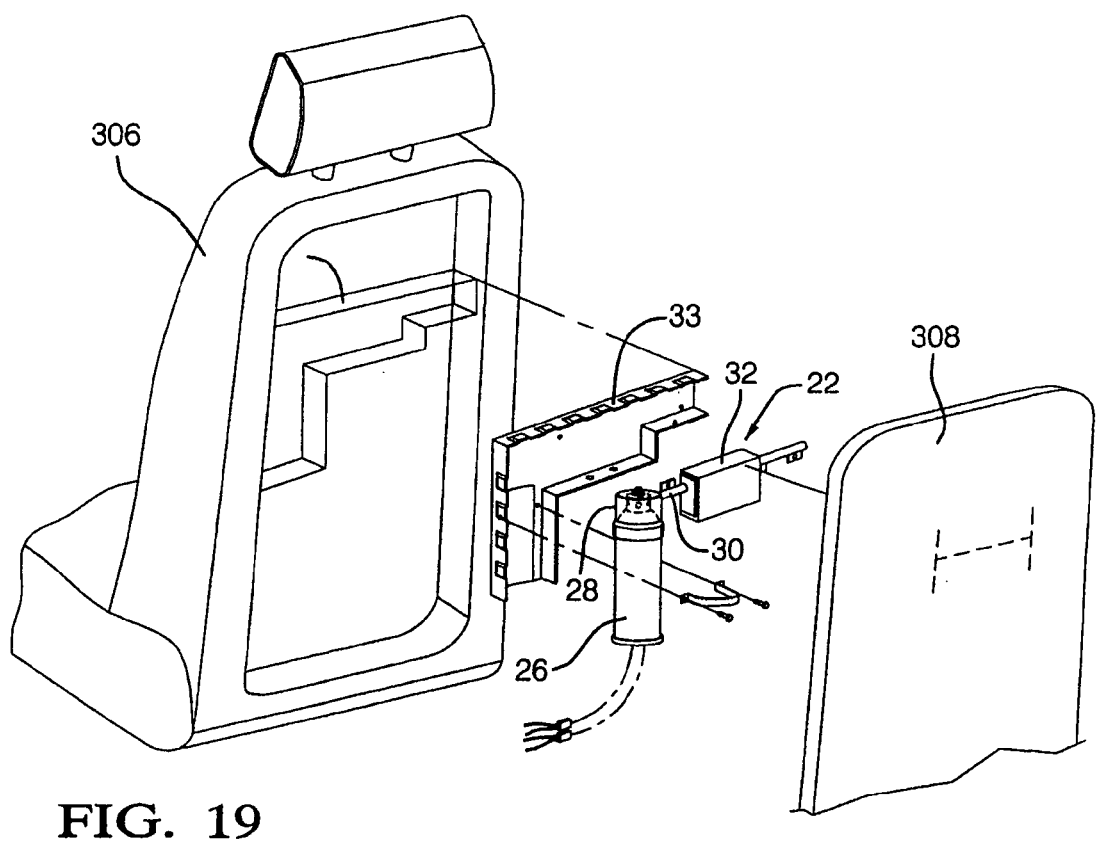
FIG. 19 is an expanded view of the seat back with the air bag system of the present invention.
Figure 20:
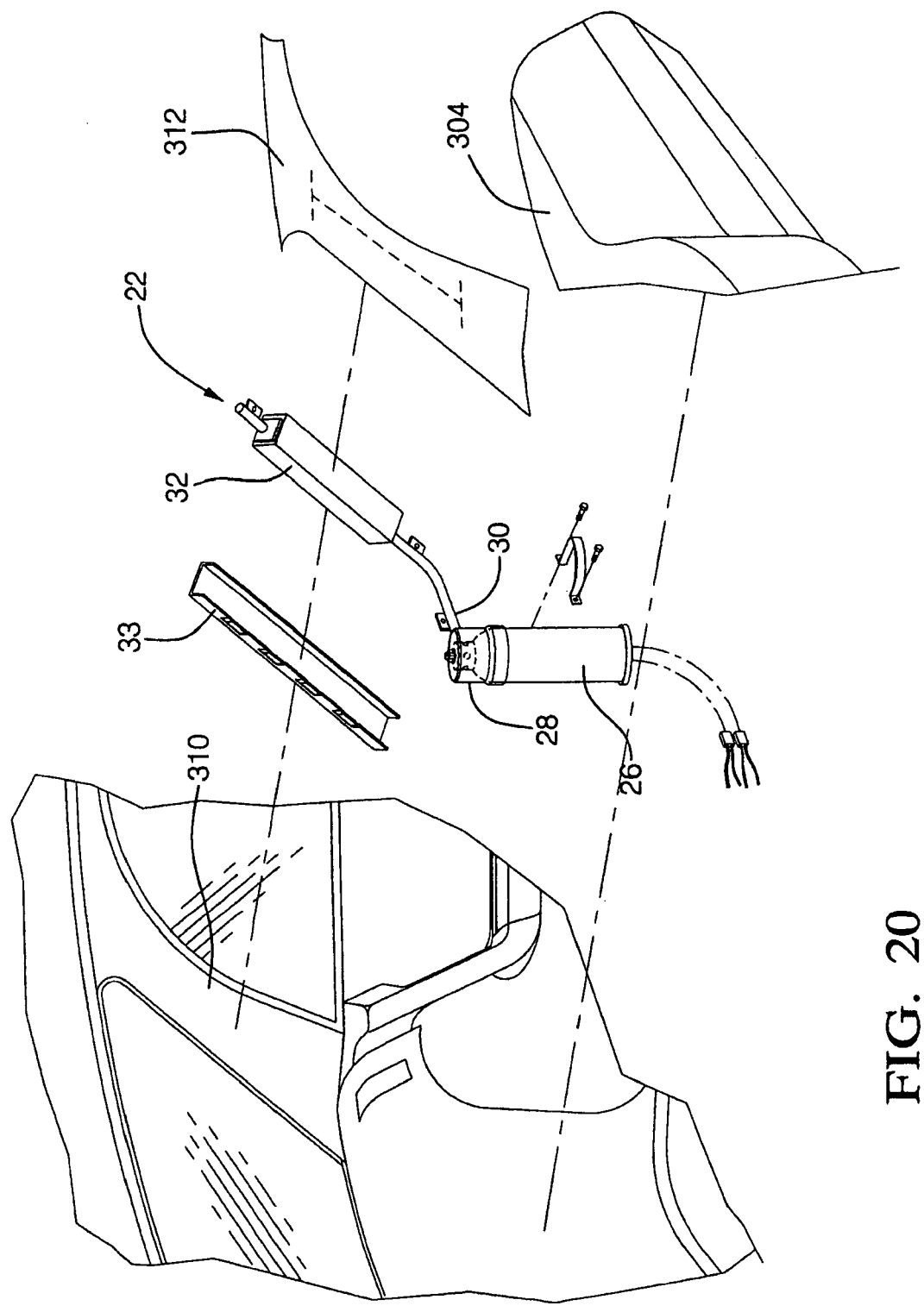
FIG. 20 is an expanded or exploded view of the pillar with the air bag system of the present invention.

As previously mentioned, the air bag system 22 described herein can be installed in locations other than the vehicle door. FIGS. 18–20 schematically illustrate some of the potential locations. FIG. 18 illustrates an instrument panel 18 location where the air bag system 22 is positioned between the instrument panel structure 302 and the instrument panel show surface 304. FIG. 20 illustrates a seat location where the air bag system 22 is positioned between the seat back structure 306 and the seat rearward show surface 308. In this case, the deployed air bag would restrain the occupant sitting behind the seat in which it is mounted. Finally, FIG. 21 illustrates an upper pillar or roof location where the air bag system 22 is positioned between the vehicle structure 310 (pillar or roof rail) and the pillar trim 312 and instrument panel 304.

The present invention air bag system provides the function of a dual depth deployed cushion with a remotely located inflator for increased packaging flexibility.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The invention claimed is:

1. A vehicle having an air bag system for impact restraint, comprising:
   a vehicle body defining a vehicle interior space therein;
   an occupant seat located within the interior space;
   the air bag system comprising a primary gas emitting inflator for emitting inflation gas upon receiving a signal of an impact, a fill tube in fluid communication with the inflator to port the inflation gas from the inflator, and an air bag cushion in fluid communication with the fill tube to receive the inflation gas from the fill tube and deployable in the interior space adjacent to the occupant seat upon the impact;
   the air bag system further comprising at least one tether operable to a restricted length and an unrestricted length and having a tether loop, and a dual depth mechanism operable in a non-actuated state to retain the tether loop and hold the tether to the restricted length and in an actuated state to release the tether loop.

2. A vehicle having an air bag system for impact restraint as defined in claim 1, wherein the dual depth mechanism comprises:
   a housing;
   a piston disposed in the housing and translatable from a non-actuated position to an actuated position;
   an actuator operable to selectively translate the piston from the non-actuated state to the actuated state; and
   a stud configured for releaseably retaining the tether loop, wherein the tether loop is releasable from the stud upon translation of the piston.

3. A vehicle having an air bag system for impact restraint, as defined in claim 2, wherein the housing further includes a first opening in fluid communication with the fill tube and a second opening in fluid communication with atmosphere and the piston includes a gas escape passage extending therethrough and in alignment with the first and second housing openings when the piston is in the non-actuated position and out of alignment when the piston is in the actuated position.

4. A vehicle having an air bag system for impact restraint, as defined in claim 2, wherein the dual depth mechanism further includes a retention feature to hold the piston in the non-actuated position prior to deployment of the actuator.

5. A vehicle having an air bag system for impact restraint, as defined in claim 4, wherein the dual depth mechanism further includes a fastener securing the piston to the housing, the piston having a slot adjacent the fastener wherein the retention feature is a piston retention wall disposed between the fastener and the piston slot such that upon actuation of the actuator, the retention wall is released as the piston translates.

6. A vehicle having an air bag system for impact restraint, as defined in claim 5, wherein the piston slot includes notches to slow down the piston and to prevent piston bounce back when the piston reaches the actuated position.

7. A vehicle having an air bag system for impact restraint, as defined in claim 3, wherein the dual depth mechanism is secured to a downstream open end of the fill tube such that the downstream end of the fill tube is in alignment with the first opening in the housing.

8. A vehicle having an air bag system for impact restraint, as defined in claim 2, wherein the dual depth mechanism is secured adjacent to the fill tube intermediate the inflator and the cushion and the fill tube further includes a radial opening in alignment with the first housing opening.

9. A vehicle having an air bag system for impact restraint, as defined in claim 2, wherein the piston further includes a tether loop passage through which the tether loop is routed before slipping the tether loop over the stud.

10. A vehicle having an air bag system for impact restraint, as defined in claim 9, wherein a piston portion adjacent the tether loop passage operates like a scraper to release the tether loop from the stud upon actuation of the dual depth mechanism.

11. A vehicle having an air bag system for impact restraint, as defined in claim 2, wherein the stud is located outside the cushion for visual inspection of the tether loop prior to assembly.

12. A vehicle having an air bag system for impact restraint, as defined in claim 2, further including a reverse travel prevention feature to hold the piston in the actuated position after deployment of the actuator.

13. A vehicle having an air bag system for impact restraint, as defined in claim 2, wherein the actuator is disposed within the piston.

14. A vehicle having an air bag system for impact restraint as defined in claim 2, further comprising structure to stop movement of the piston at the actuated position.

15. A vehicle having an air bag system for impact restraint as defined in claim 2, further comprising structure operable to slow movement of the piston as the piston translates to the actuated position.

16. A vehicle having an air bag system for impact restraint, as defined in claim 2, wherein the stud is fixed to the housing and the stud remains stationary during the translation of the piston.

17. A vehicle having an air bag system for impact restraint, as defined in claim 2, wherein the stud is formed by the piston.

18. A vehicle having an air bag system for impact restraint, as defined in claim 17, wherein the housing further includes a first opening in fluid communication with the fill tube and a second opening in fluid communication with atmosphere, wherein the openings remain open when the piston is in the non-actuated position and are closed by the piston when the piston is in the actuated position.

19. A vehicle having an air bag system for impact restraint, as defined in claim 17, wherein the fill tube further includes a first opening configured to contain a portion of the piston when the piston is in the non-actuated position and a second opening in fluid communication with the atmosphere, wherein the second opening remains open when the piston is in the non-actuated position and wherein the both openings are closed by the portion of the piston when the piston is in the actuated position.

20. A vehicle having an air bag system for impact restraint, as defined in claim 17, wherein the housing further includes a secondary inflator vent, and wherein the actuator is a secondary gas emitting inflator, wherein the secondary inflator vent remains closed when the piston is in the non-actuated state and gas from the secondary inflator is vented through the secondary inflator vent when the piston is in the actuated state.

21. A vehicle having an air bag system for impact restraint, as defined in claim 17, further including an extension adjacent to the housing, wherein the extension at least partially defines a tether loop passage through which the tether loop is routed before slipping the tether loop over the stud.

22. A vehicle having an air bag system for impact restraint, as defined in claim 21, wherein movement of the stud operates to release the tether loop from the stud upon actuation of the dual depth mechanism.

23. A vehicle having an air bag system for impact restraint, as defined in claim 1, further comprising a plenum having an inflation gas passage fluidly connecting the primary inflator to the fill tube and having a piston chamber.

24. A vehicle having an air bag system for impact restraint, as defined in claim 23, wherein the plenum further includes a first vent fluidly connecting the inflation gas passage and the piston chamber and a second vent fluidly connecting the piston chamber to atmosphere; and
the piston having a slot extending therethrough and in alignment with the first and second plenum vents when the piston is in the non-actuated position and out of alignment when the piston is in the actuated state.

25. A vehicle having an air bag system for impact restraint, as defined in claim 24, wherein the actuator is a secondary gas emitting inflator and upon actuation, gas from the secondary inflator is vented through the second vent when the piston is translated to the actuated position.

26. A vehicle having an air bag system for impact restraint, as defined in claim 1, wherein the cushion further includes:
a horizontal tabular slot on a rear interior portion of the cushion; and
the tether is routed through the tubular slot to the dual depth mechanism and has a first end, opposing the dual depth mechanism fixed to a forward portion of the cushion.

27. A vehicle having an air bag system for impact restraint, as defined in claim 26, wherein the tether has a second end extending through a vent opening in the cushion.

28. A vehicle having an air bag system for impact restraint, as defined in claim 18, wherein the tether has a second end fixed to a laterally-opposing forward portion of the cushion than the first end.

29. A vehicle having an air bag system for impact restraint, as defined in claim 26, wherein the tubular slot is formed by a sewn internal pleat in the rear portion of the cushion.

30. A vehicle having an air bag system for impact restraint, as defined in claim 26, wherein the tubular slot is formed by an internal panel having two horizontal seams secured to the rear portion of the cushion.

31. A vehicle having an air bag system for impact restraint, as defined in claim 26, wherein the cushion further includes an internal panel having two vertical seams secured to the rear portion of the cushion and a secondary panel fixed to the internal panel to form the tubular slot.

32. A vehicle having an air bag system for impact restraint, as defined in claim 26, wherein the cushion further includes an internal panel having two horizontal seams secured to the rear portion of the cushion and a secondary panel fixed to the internal panel to form the tubular slot.

33. A vehicle having an air bag system for impact restraint, as defined in claim 1, further comprising:
a side vehicle door adjacent the occupant seat; and
wherein the air bag system is packaged within the vehicle door.

34. A vehicle having an air bag system for impact restraint, as defined in claim 1, further comprising:
an instrument panel forward of the occupant seat; and
wherein the air bag system is packaged within the instrument panel.

35. A vehicle having an air bag system for impact restraint, as defined in claim 1, wherein:
the occupant seat is provided for a rear occupant; and
further comprising a front seat forward of the occupant seat and having a seat back structure and a rear seat back surface, and wherein the air bag system is packaged within the front seat and is deployable in the interior space between the front seat and the occupant seat during an impact.

36. A vehicle having an air bag system for impact restraint, as defined in claim 1, wherein the vehicle body includes:
an upper vehicle structure and an instrument panel; and
the air bag system is packaged within the upper vehicle structure and the instrument panel and is deployable in the interior space forward of the occupant seat upon the impact.

37. A vehicle having an air bag system for impact restraint, comprising:
   a vehicle body defining a vehicle interior space therein;
   an occupant seat located within the interior space;
   a side vehicle door adjacent the occupant seat;
   the air bag system packaged within the vehicle door comprising a primary gas emitting inflator for emitting inflation gas upon receiving a signal of an impact, a fill tube in fluid communication with the inflator to port the inflation gas from the inflator, and an air bag cushion in fluid communication with the fill tube to receive the inflation gas from the fill tube and deployable in the interior space adjacent to the occupant seat upon the impact;
   the air bag system further comprising at least one tether operable to a restricted length and an unrestricted length and having a tether loop, and a dual depth mechanism operable in a non-actuated state to retain the tether loop and hold the tether to the restricted length and in an actuated state to release the tether loop and the tether to the unrestricted length;
   the dual depth mechanism comprising a housing;
   a piston disposed in the housing and translatable from a non-actuated position to an actuated position;
   an actuator operable to selectively translate the piston from the non-actuated state to the actuated state; and
   a stud configured for releaseably retaining the tether loop,
   wherein the tether loop is releasable from the stud upon translation of the piston;
   wherein the cushion further includes:
   a horizontal tubular slot on a rear interior portion of the cushion; and
   the tether is routed through the tubular slot to the dual depth mechanism and has a first end, opposing the dual depth mechanism, fixed to a forward portion of the cushion.

38. A vehicle having an air bag system for impact restraint, as defined in claim 37, wherein the piston is formed as the stud.

39. A dual depth mechanism for a vehicle air bag system comprising:
   a dual depth mechanism housing having:
      a canister receiving portion;
      an inflation gas portion;
      a fill tube receiving portion; and
      a piston receiving portion;
   said piston receiving portion defining:
      a piston housing;
      an expandable piston chamber in communication with said piston housing, and
      an exterior wall opening;
   a piston reciprocatable in said piston housing; and
   an actuator in said exterior wall opening and in communication with said expandable piston chamber;
   said piston having one position in said piston housing for facilitating one depth for the air bag and another position in said piston housing for facilitating another depth for the air bag.

* * * * *